US007773578B2

(12) United States Patent
Liu

(10) Patent No.: US 7,773,578 B2
(45) Date of Patent: Aug. 10, 2010

(54) PACKET TRANSMISSION METHOD FOR WIRELESS SIGNALS IN A WIRELESS BASE STATION SYSTEM

(75) Inventor: Sheng Liu, Guangdong (CN)

(73) Assignee: Utstarcom Telecom Co., Ltd., Hangzhou, Zhejiang (CN)

( * ) Notice: Subject to any disclaimer, the term of this patent is extended or adjusted under 35 U.S.C. 154(b) by 627 days.

(21) Appl. No.: 11/632,600

(22) PCT Filed: Jul. 13, 2004

(86) PCT No.: PCT/CN2004/000801

§ 371 (c)(1),
(2), (4) Date: Sep. 21, 2007

(87) PCT Pub. No.: WO2006/005229

PCT Pub. Date: Jan. 19, 2006

(65) Prior Publication Data

US 2008/0069032 A1 Mar. 20, 2008

(51) Int. Cl.
*H04L 12/28* (2006.01)
*H04W 4/00* (2009.01)
*H04M 1/00* (2006.01)

(52) U.S. Cl. ........................ 370/351; 370/328; 455/560; 455/561

(58) Field of Classification Search .................. 370/328, 370/351; 455/560, 561
See application file for complete search history.

(56) References Cited

U.S. PATENT DOCUMENTS 5,657,374 A 8/1997 Russell et al.

(Continued)

FOREIGN PATENT DOCUMENTS

CN 1288628 3/2001

(Continued)

OTHER PUBLICATIONS

Common Public Radio Interface (www.cpri.info/spec.html), p. 4.

(Continued)

*Primary Examiner*—Lester Kincaid
*Assistant Examiner*—Kuo Woo
(74) *Attorney, Agent, or Firm*—The Webb Law Firm

(57) ABSTRACT

A method of transmitting one or more branches of wireless signals between a channel processing unit and a remote radio frequency unit in a centralized base station, or between base stations through a packet network, each of said branches of wireless signals being a signal flow having a wireless frame period, the method comprising steps: obtaining a sample data stream of wireless signal of each branch in said wireless signals; dividing said sample data stream into consecutive data segments of fixed length; encapsulating said data segments into application protocol packets according to a predetermined protocol, each application protocol packet further including first information indicating the sequence of the data segment of the packet in all the data segments of the branch to which the data segment belongs; second information indicating payload type of the branch; third information indicating whether the data segment of the packet contains a data sample corresponding to the start of a wireless frame period; and fourth information indicating the position of the data sample in the data segment if the third information indicates that the data sample corresponding to the start of the wireless frame period is contained; and encapsulating the generated application protocol packets into network protocol packets according to a network transport protocol and transmitting them to a specified target, wherein the network protocol packet further includes fifth information identifying one of said one or more branches to which the packet belongs, said fifth information and network transport source address and destination address uniquely distinguishing said branches.

34 Claims, 11 Drawing Sheets

U.S. PATENT DOCUMENTS

| | | | |
|---|---|---|---|
| 6,314,095 B1 * | 11/2001 | Loa | 370/352 |
| 6,324,391 B1 | 11/2001 | Bodell | |
| 6,594,496 B2 | 7/2003 | Schwartz | |
| 6,731,649 B1 | 5/2004 | Silverman | |
| 6,950,398 B2 * | 9/2005 | Guo et al. | 370/235 |
| 2005/0107124 A1 * | 5/2005 | Osterling et al. | 455/561 |

FOREIGN PATENT DOCUMENTS

| | | |
|---|---|---|
| CN | 1464666 | 12/2003 |
| CN | 1471331 | 1/2004 |
| WO | WO 2005/086509 | 9/2005 |

OTHER PUBLICATIONS

Doolan et al., MPLS Label Stack Encapsulation in IP, Jul. 2001.
Schulzrine et al., RFC 1889, RTP: A Transport Protocol for Real-Time Applications, Jan. 1996.
TR25.836 NodeB Synchronisation for TDD, 3GPP, Aug. 2000.
Rosen et al., RFC 3032, MPLS Label Stack Encoding, Jan. 2001.
Postel, RFC 768, User Datagram Protocol, Aug. 28, 1980.

* cited by examiner

PACKET TRANSMISSION METHOD FOR WIRELESS SIGNALS IN A WIRELESS BASE STATION SYSTEM

TECHNICAL FIELD

The present invention relates to base station technique in a mobile communication system, and in particular relates to a signal transmission method and system in a wireless base station system.

BACKGROUND ART

1. Centralized Base Station Technique Based on Remote Radio Frequency Units

In a mobile communication system, as shown in FIG. 1a, a wireless access network is typically composed of base stations (BTS) and a base station controller (BSC) or wireless networks controller (RNC) for controlling the base stations. As shown in FIG. 1b, a base station is mainly composed by a baseband processing subsystem, a radio frequency (RF) subsystem, antennas and etc., and performs transmission, reception and processing of wireless signals. The base station may cover different cells through a plurality of antennas.

In the mobile communication system, there are wireless network coverage problems that are more difficult to solve with conventional BTS technology, such as indoor coverage of high-rise buildings, coverage hole, or the coverage of shadow zone. The technique based on remote radio frequency units is a more effective solution being proposed to solve the above problems. In the base station system based on remote radio frequency units, main radio frequency units and antennas are installed in regions where it is required to provide a coverage, and are connected to other units in the base station through wideband transmission lines.

The technique may be further developed as the centralized base station technique based on remote radio frequency units. as compared to the conventional base station, the centralized base station based on remote radio frequency units has many advantages: allowing to replace one macro cell based on the conventional base station with a plurality of micro cells, thereby best accommodating different wireless environments and increasing wireless performances such as capacity, coverage and etc. of the system; the centralized structure makes it possible to perform soft handoff in the conventional base station by softer handoff, thereby obtaining an additional processing gain; and the centralized structure also makes it possible to use costly baseband signal processing resources as a resource pool shared by a plurality of cells, thereby obtaining benefits of statistical multiplexing and reduced system cost. United States patents, U.S. Pat. No. 5,657,374, "Cellular system with centralized base stations and distributed antenna units", U.S. Pat. No. 6,324,391, "Cellular communication with centralized control and signal processing", and etc. describes relevant implementation details about this technique.

As shown in FIG. 2, centralized base station system 10 based on remote radio frequency units is mainly composed of centrally installed central channel processing main unit (MU) 11 and remote radio frequency units (RRUs) 13 which are connected through wideband transmission links or network 12. BSC/RNC interface unit 14 in the central channel processing main unit 11 is in charge of performing user plane and signaling plane processing of BTS and BSC/RNC interface. The central channel processing main unit 11 further comprises channel processing resource pool 15, signal routing distribution unit 16 and etc., wherein the channel processing resource pool 15 is formed by stacking a plurality of channel processing units 1-N, and performs tasks such as baseband signal processing, and the signal distribution unit 16 dynamically allocates channel processing resources according to traffics of different cells to realize effective sharing of the processing resources among multiple cells. Besides the implementation inside the MU as shown in FIG. 2, the signal routing distribution unit 16 may also be implemented as a separate device outside the MU. The remote antenna element is mainly constituted by functional units such as the transmission channel's radio frequency power amplifier, the reception channel's low noise amplifier, duplexer, antennas and etc. The link between the central channel processing subsystem and the remote antenna element may adopt transmission medium such as optical fiber, coaxial cable, microwave and etc.; the signal transmission may be done by way of digital signals after sampling, or analog signals after modulating; And the signals may be baseband signals, intermediate frequency signals or radio-frequency signals.

In the above two kinds of base station system based on remote radio frequency units, it is important to achieve wireless signal transmission between the RRU and the MU. It is typical to use analog Intermediate Frequency transmission solution or analog radio frequency signal transmission solution. Although it is easier to adopt analog signal transmission, the analog line will certainty introduce interference components such as noise, and the signal modulation during the transmission will also introduce nonlinear distortion. In addition, the analog transmission reduces transmission line utilization, and is inconvenient for application of high-capacity multiplexing technique. Therefore, it is difficult to form a large scale network with the analog transmission solution.

To this end, China patent applications, CN1464666, "Soft base station system based on fiber optic stretch and synchronous method thereof", CN1471331, "Base station system for mobile communication" and etc. propose a solution of using digital signal transmission. To reduce the demand on transmission bandwidth as far as possible, it is usual to adopt the digital baseband signal transmission solution. CN1464666 only discloses a simple method of transmitting digital I/Q (in phase/quadrature) baseband signal between the RRU and the main base station by using optical fiber, that is, a digital I/Q baseband signal undergoes parallel to serial conversion to become a serial data stream at the transmitting end, is transmitted to the receiving end via an optical transmitter, and at the receiving end, undergoes serial to parallel conversion after reception to be recovered into the digital I/Q baseband signal; CN1471331 proposes a technique using Ethernet on physical layer, not using Ethernet MAC (media access control) frame, but using a transmission technique having particularly defined consecutive bit stream format. Presently, a cooperation organization named CPRI (Common Public Radio Interface) is also working on standardization of digital baseband transmission between the RRU and the main base station, and its technical specification can be downloaded from website http://www.cpri.info/spec.html. The specification adopts a technique similar to CN1471331, i.e., the physical interface adopts giga or 10GB Ethernet standard, and upper layers adopt self-defined consecutive bit stream format, but CPRI only supports point-to-point link. Since the above existing techniques adopt dedicated protocol specifications in transport layer technique without using a sophisticated transmission technique, many potential technique problems needs to be verified in actual systems, technical development and product development cycle is longer, network construction cost is higher. This is disadvantageous for the application of large scale network, and is also disadvantageous for protecting existing investment of operators.

2. Load-Sharing Technique in the Wireless Base Station System

In a patent application entitled "load-sharing method and system in a wireless base station" filed in China patent office on Mar. 4, 2004, the same inventors propose a method of channel processing load-sharing between wireless base stations, where the base stations are connected through wideband links to form a distributed wireless base station system, and when the traffic amount of cells served by a base station is too heavy or a part or all of its channel processing units fail, it is possible to route or switch, through the wideband links between the base stations, wireless signals corresponding to the part or all of cells served by the base station to one or more other remote end base stations connected therewith, and to share the part or all of processing load of the base station by the other remote end base stations, thereby reducing call loss of the entire base station system due to inadequate resource, and facilitating to increase resource utilization and reliability of the entire base station system.

Since the wideband links for transmitting wireless signals between the base stations have properties similar to that between the RRU and the MU in the above base station system based on remote radio frequency units, the wireless signal transmission technique between the RRU and the MU in the base station system based on remote radio frequency units is also applicable to the wireless signal transmission between the wireless base stations having load-sharing structure.

3. Origination of the Invention

In sum, there is a need for transmission of wireless signals between MU and RRU and between BTSs in the wireless base station system. However, there are still some problems existing in the prior art, and on the other hand, techniques for transmitting high-capacity IP packets on wide area network, such as IP over SDH (synchronous digit sequence), IP over DWDM (dense wave division multiplex) and etc. have been grown up and used widely. As the development of wideband technique such as IEEE 802.3ab giga Ethernet (GE), IEEE 802.3ae 10 giga Ethernet (10GE) and etc., it is possible to build a packet exchange network of high speed, wideband and cheaper than conventional telecommunication transmission network within range of local area network (LAN). Further, because of the emergence of technique for directly carrying Ethernet MAC frames on wideband transmission network such as SDH, DWDM and CWDM (coarse wave division multiplex), and the support of optional wide area network (WAN) interface sublayer in 10GE to VC-4-64c container of direct transmission SDH, the wideband packet exchange network based on Ethernet is extended from local area network application to wide area network.

Therefore, if digital wireless signals between the RRU and the MU in the base station system based on remote radio frequency units can be transmitted by using a wideband packet exchange network of relatively low cost and compatible with the existing techniques, it will be beneficial for implementing a lower cost, fast, flexible large scale networking application. To this end, the present invention proposes a method of packet transmission of wireless signals (Radio over Packet) in the wireless base station system.

SUMMARY OF THE INVENTION

An object of the present invention is to provide a method of transmitting or receiving one or more branches of wireless signals between a channel processing unit and a remote radio frequency unit in a centralized base station, or between base stations through a packet network, so that said signal processing unit and said remote radio frequency unit can be connected through the packet network.

Another object of the present invention is to provide a method of measuring round trip transmission latency of a wireless signal branch between a channel processing unit and a remote radio frequency unit in a centralized base station, so as to facilitate the measurement and adjustment of system performance.

Another object of the present invention is to provide a method in a centralized base station of adjusting the wireless frame timing of a remote radio frequency unit through the wireless signal branch transmission between a channel processing unit and the remote radio frequency unit, so that the wireless frame timing of the remote radio frequency unit is synchronous with that of the channel processing unit.

According to one aspect of the present invention, there is provided a method of transmitting one or more branches of wireless signals between a channel processing unit and a remote radio frequency unit in a centralized base station, or between base stations through a packet network, each of said branches of wireless signals being a signal flow having a wireless frame period, the method comprising steps: obtaining a sample data stream of wireless signal of each branch in said wireless signals; dividing said sample data stream into consecutive data segments of fixed length; encapsulating said data segments into application protocol packets according to a predetermined protocol, each application protocol packet further including first information indicating the sequence of the data segment of the packet in all the data segments of the branch to which the data segment belongs; second information indicating payload type of the branch; third information indicating whether the data segment of the packet contains a data sample corresponding to the start of a wireless frame period; and fourth information indicating the position of the data sample in the data segment if the third information indicates that the data sample corresponding to the start of the wireless frame period is contained; and encapsulating the generated application protocol packets into network protocol packets according to a network transport protocol and transmitting them to a specified target, wherein the network protocol packet further includes fifth information identifying one of said one or more branches to which the packet belongs, said fifth information and network transport source address and destination address uniquely distinguishing said branches.

According to one embodiment, each said branch comprises a wireless signal data stream belonging to the same function node, the same cell, the same carrier frequency, the same wireless interface standard and system.

According to another embodiment, at least one branch comprises wireless signals of a plurality of parallel channels, and sample data of the at least one branch is simultaneous sample data of wireless signals of the plurality of parallel channels.

According to another embodiment, said step of encapsulating into network protocol packets according to a network transport protocol comprises: encapsulating the application protocol packets into UDP packets of fixed length according to a user datagram protocol (UDP), wherein the UDP packet header comprises source port number and destination port number forming the fifth information; and encapsulating the UDP packets into network protocol packets according to an IPv4 or IPv6 protocol.

According to another embodiment, said step of encapsulating into network protocol packets according to a network transport protocol comprises: encapsulating the application protocol packets into MPLS packets of fixed length according to a multiple protocol label switch MPLS) protocol, wherein a MPLS virtual circuit label serves as said fifth information, and MPLS tunnel label serves to identify the connection between the network transport source address and the destination address.

According to another embodiment, said step of encapsulating into network protocol packets according to a network transport protocol comprises: encapsulating the application protocol packets into MPLS packets of fixed length according to multiple protocol label switch MPLS) protocol, wherein a MPLS virtual circuit label serves as said fifth information, and a MPLS tunnel label serves to identify the connection between the network transport source address and the destination address; and encapsulating the MPLS packets into network protocol packets according to an IPv4 or IPv6 protocol.

According to another embodiment, said step of encapsulating according to a predetermined protocol comprises: encapsulating the data segments into data packets of fixed length, wherein the data packet header comprises said fourth information; and encapsulating the data packet into RTP packets of fixed length according to real time transmission protocol (RTP), as the application protocol packets, wherein the RTP packet header comprises said first information, second information and third information, and the RTP packets belonging to the same branch have the same synchronization source identifier.

According to another embodiment, said step of encapsulating according to a predetermined protocol comprises: encapsulating the data segments into application protocol packets of fixed length, wherein the application protocol packet header comprises said first information, second information, third information and fourth information.

According to another embodiment, the length of the data segments is selected so that the transmission latency meets a specified requirement.

According to another embodiment, the length of the data segments is dynamically changed according to an actual measurement of transmission latency so that the transmission latency meets a specified requirement.

According to another embodiment, the method further comprises: adjusting transmission path and forward policy in the packet network according to the source and destination of current transmission, to reduce the transmission latency and latency jitter.

According to another embodiment, said packet network has a service quality control mechanism, said method further comprising: setting service quality level of said network protocol packets as high as possible in said service quality control mechanism.

According to another embodiment, transmitting said network protocol packets in preference to other packets.

According to another aspect of the present invention, there is provided a method of receiving one or more branches of wireless signals between a channel processing unit and a remote radio frequency unit in a centralized base station, or between base stations through a packet network, each of said branches of wireless signals being a signal flow having a wireless frame period, the method comprising steps: receiving network protocol packets of fixed length through a network; parsing the network protocol packets according to a network transport protocol to obtain application protocol packets of fixed length, and fifth information identifying one of said one or more branches to which the packet belongs, said fifth information and network transport source address and destination address uniquely distinguishing said branches;

parsing the application protocol packets according to a predetermined protocol to obtain data segments, and first information indicating the sequence of the data segment of the packet in all the data segments obtain the branch to which the data segment belongs; second information indicating load type of the branch; third information indicating whether the data segment of the packet contains a data sample corresponding to the start of a wireless frame period; and fourth information indicating the position of the data sample in the data segment if the third information indicates that the data sample corresponding to the start of the wireless frame period is contained; recovering the data segments belonging to the same branch as original wireless signals according to the fifth information, wherein the data segments are ordered according to the first information to form a digital signal data stream, reproducing the digital signal data stream into a wireless signal flow according to the second information indicating the load type, wherein if the third information indicates that a data segment includes a data sample corresponding to the start of a wireless frame period, the wireless frame timing corresponding to the data sample is recovered according to the position indicated by the fourth information when reproducing the wireless signal flow.

According to another embodiment, at least one branch comprises wireless signals of a plurality of parallel channels, and sample data of the at least one branch is simultaneous sample data of wireless signals of the plurality of parallel channels, said step of recovering wireless signals comprises simultaneously reproducing the wireless signals of the plurality of parallel channels according to the same wireless frame timing.

According to another embodiment, said step of parsing the network protocol packets according to a network transport protocol comprises: parsing the network protocol packets into user datagram protocol (UDP) packets of fixed length according to a IPv4 or IPv6 protocol; and parsing the UDP packets into application protocol packets of fixed length according to the UDP protocol, and obtaining a source port number and a destination port number forming the fifth information.

According to another embodiment, said step of parsing the network protocol packets according to a network transport protocol comprises: processing a MPLS tunnel label and a MPLS virtual circuit label according to a multiple protocol label switch (MPLS) protocol; and parsing the MPLS packets into application protocol packets according to the MPLS protocol, and obtaining a MPLS virtual circuit label as said fifth information.

According to another embodiment, said step of parsing the network protocol packets according to a network transport protocol comprises: parsing the network protocol packets into MPLS packets according to an IPv4 or IPv6 protocol; processing a MPLS tunnel label and a MPLS virtual circuit label according to a multiple protocol label switch (MPLS) protocol; and parsing the MPLS packets into application protocol packets according to the MPLS protocol, and obtaining a MPLS virtual circuit label as said fifth information.

According to another embodiment, said step of parsing according to a predetermined protocol comprises: parsing RTP packets of fixed length, as the application protocol packets, into data packets of fixed length according to a real time transmission protocol (RTP), and obtaining said first information, second information and third information; and parsing the data packets of fixed length into data segments, and obtaining said fourth information.

According to another embodiment, said step of parsing according to a predetermined protocol comprises: parsing the application protocol packets of fixed length into data segments, and obtaining said first information, second information, third information and fourth information.

According to another embodiment, when the receiving party is a remote radio frequency unit, said method further comprising: obtaining a reference clock from a global common clock.

According to another embodiment, said global common clock source is GPS.

According to another embodiment, when the receiving party is a remote radio frequency unit, said method further comprising: recovering the clock by using an adaptive clock recovery technique according to said digital signal data stream.

According to another embodiment, said adaptive clock recovery technique is PLL.

According to another embodiment, said recovering step further comprises: if the third information indicates that a data segment includes a data sample corresponding to the start of a wireless frame period, the sample length of the data segment is subtracted by the position value indicated by the fourth information and is multiplied by the downlink sampling interval, obtaining the packing latency of the data segment; and performing correction on the packing latency when recovering the wireless frame timing corresponding to the data sample at time of reproducing the wireless signal flow.

According to another embodiment, said recovering wireless frame timing further comprises performing smoothing processing by using periodicity of the wireless frame timing.

According to another aspect of the present invention, there is provided a method of measuring round trip transmission latency of a wireless signal branch between a channel processing unit and a remote radio frequency unit in a centralized base station, said transmission being based on the above transmitting method and receiving method, said measuring method comprising: transmitting a first network protocol packet by the channel processing unit to the remote radio frequency unit, wherein the data segment therein includes a data sample corresponding to the start of a wireless frame period on the channel processing unit; receiving a second network protocol packet transmitted from the remote radio frequency unit on the channel processing unit, wherein the data segment therein includes a data sample corresponding to the start of a wireless frame period on the remote radio frequency unit, and the wireless frame period corresponds to the wireless frame period on said channel processing unit; calculating a time difference from the start of the above transmitting step to the end of the above receiving step; respectively calculating packing latencies of said first and second network protocol packets, the latency being equal to the sample length of the data segment in the network protocol packet subtracted by the position value indicated by the fourth information and multiplied by the corresponding sampling interval; and subtracting said two packing latencies from said time difference to obtain the round trip transmission latency.

According to one embodiment, said round trip transmission latency comprises a downlink transmission latency from the channel processing unit to the remote radio frequency unit, the downlink transmission latency being equal to said round trip transmission latency multiplied by a predetermined proportion factor.

According to another embodiment, said predetermined proportion factor is 0.5.

According to another aspect of the present invention, there is provided a method in a centralized base station of adjusting the wireless frame timing of a remote radio frequency unit through the wireless signal branch transmission between a channel processing unit and the remote radio frequency unit, said transmission being based on the above transmitting method and receiving method, said adjusting method comprising: obtaining a round trip transmission latency through the above measuring method; multiplying said round trip transmission latency by a predetermined proportion factor to obtain a downlink transmission latency; and advancing the transmitting time of the branch relative to the wireless frame timing by a time amount equal to said downlink transmission latency.

DESCRIPTION OF THE DRAWINGS

The above and/or other aspects, features and/or advantages of the present invention will be further appreciated in view of the following description by referring to the accompanying figures, wherein.

DETAILED DESCRIPTION OF THE PREFERRED EMBODIMENTS

Figure 13A:
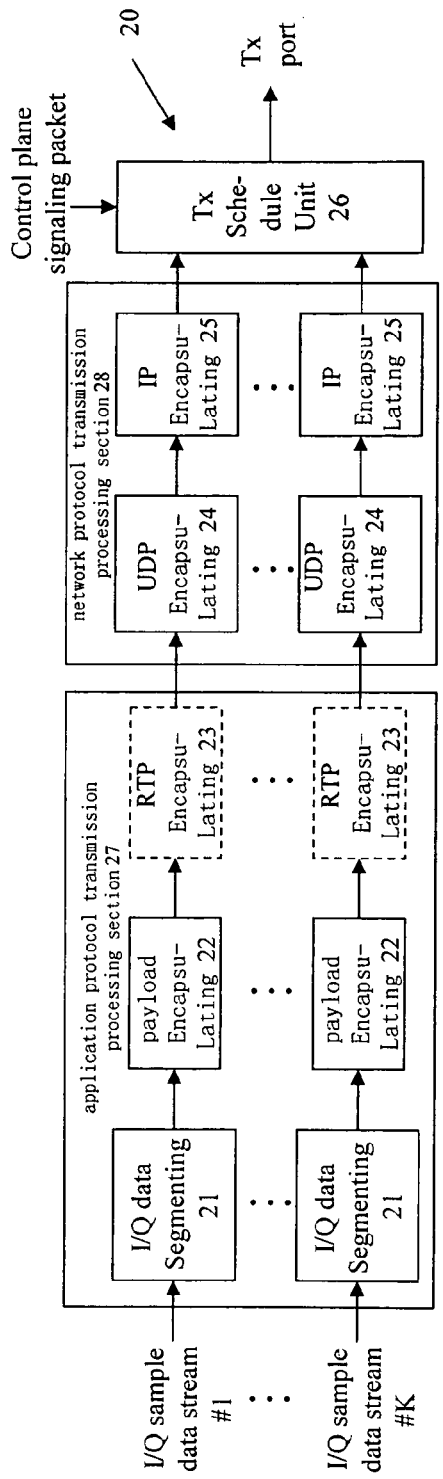
FIG. 13a is a schematic block diagram for illustrating a wireless signal packet transmitting system according to an embodiment of the present invention.

FIG. 13a is a schematic block diagram for illustrating a wireless signal packet transmitting system 20 according to an embodiment of the present invention. System 20 comprises application protocol transmission processing section 27, network protocol transmission processing section 28 and transmission scheduling unit 26.

Wireless signals of different cells, carrier frequencies and wireless interface standards within the same function node (including RRU in the base station system based on remote radio frequency units, MU in the base station system based on remote radio frequency units, wireless base station based on load-sharing structure and etc.) correspond to different transmission branches respectively, wherein each branch is in charge of transmitting a sample data stream (typically is I/Q sample data stream and etc.) of wireless signals of a single or multiple parallel channels (typically are respective antenna signals in a multiple antenna system).

Figure 14B:
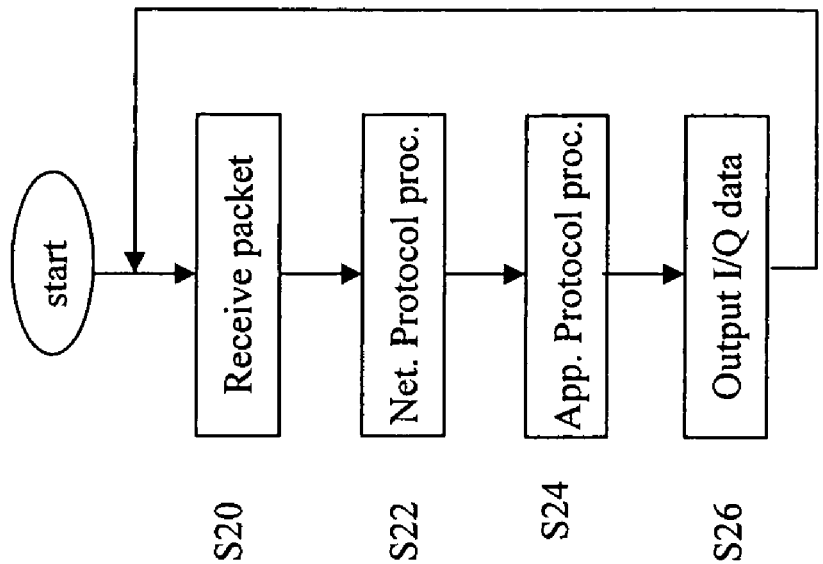
FIGS. 14a and 14b respectively show flow charts of wireless signal packet transmitting and receiving according to an embodiment of the present invention.
Figure 14A:
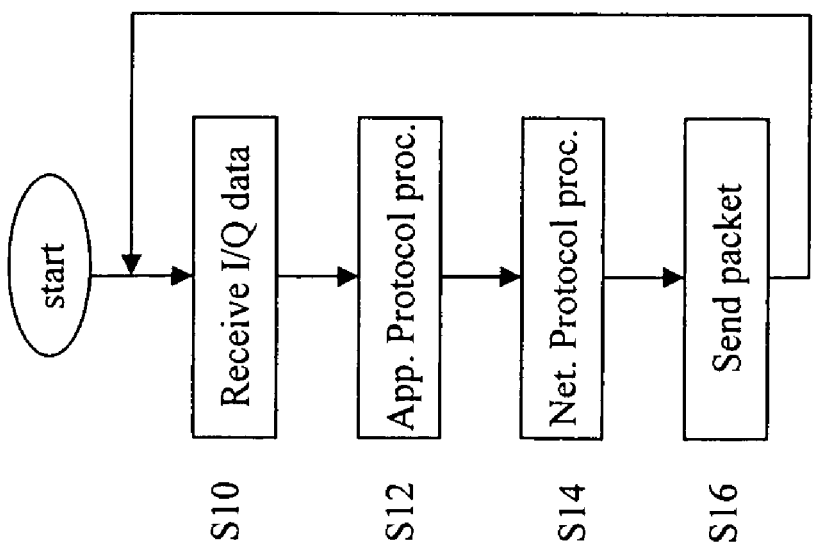

The flow chart of FIG. 14a shows the transmission processing of system 20. The transmission processing of system 20 will be illustrated with respect to one branch in the following. Actually, system 20 may simultaneously process wireless signals of one or more branches.

At step S10, system 20 receives a I/Q sample data stream of a transmission branch.

Then at step S12, the I/Q sample data stream is processed into application protocol packets by application protocol transmission processing section 27.

In one embodiment, application protocol transmission processing section 27 comprises I/Q data segmenting unit 21, payload encapsulating unit 22 and RTP encapsulating unit 23.

Figure 10:
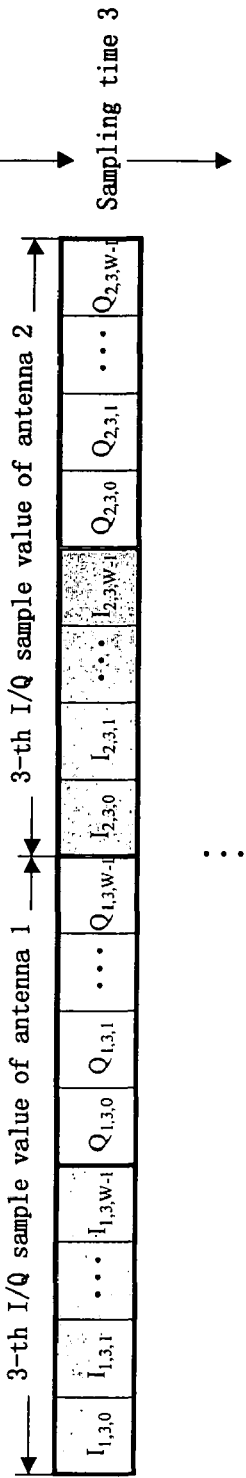
FIG. 10 shows an encapsulating structure of I/Q data payload utilized in a preferable embodiment of the present invention.

I/Q data segmenting unit 21 performs segmenting process on the I/Q sample data stream to form I/Q data payload portions. An I/Q data payload portion corresponds to a segment of the I/Q baseband wireless signal data stream. FIG. 10 shows the format of a I/Q data payload portion in a two antenna system, wherein $I_{j,k,l}$ denotes the l-th bit of the k-th sampling point of I/Q baseband signal in phase component of the j-th antenna, $Q_{j,k,l}$ denotes the l-th bit of the k-th sampling point of I/Q baseband signal orthogonal component of the j-th antenna, W is sampling bit width and its typical value is 4~20. It can be seen that, the I/Q data payload portions are arranged in the ascending order of sampling times. In case of using multiple antenna technique, the I/Q baseband signals from respective antennas are arranged in order at the same sampling time, wherein the arrangement sequence of sampling values of the respective antennas' I/Q baseband signals is the same as the spacial position arrangement sequence of the antenna array or antenna group, and sampling values of I/Q baseband signals of the same antenna are arranged in order of orthogonal components' sampling values and in phase components' sampling values. Therefore, if the number of antennas is D, and the number of sampling points of the I/Q data payload encapsulating is S, then one sampling point corresponds to 2WD bits, and the total bit number N of I/Q data payload of one packet is:

$$N = 2W \cdot D \cdot S \quad (1)$$

For a specific system, the antenna number D and sampling bit width W are certain, and the sampling point number S of I/Q data payload in one packet depends on the length of each packet for carrying the wireless signal data stream. If the length of the packet for carrying the wireless signal data stream is L bytes, and the header overhead except for the I/Q data payload is H bytes, then the sampling point number S of the I/Q data payload may expressed as:

$$S = \frac{4(L-H)}{WD} \quad (2)$$

Wherein the packet length L is selected so that the right portion of the above equation is an integer, so as for the I/Q data payload portion to align in byte, without padding bits.

Then, payload encapsulating unit 22 encapsulates the I/Q data payload portions, where a payload header is generated. RTP encapsulating unit 23 further performs encapsulating, where a RTP header is generated.

The payload encapsulating and RTP encapsulating may be conducted in different ways.

For example, in the current embodiment, the payload header and RTP header are generated respectively (i.e., in different layers). Beside the content known in the art, the payload header further comprises a pointer field and an optional link out-of-step indication bit (R). The link out-of-step indication bit is used to notify the peer end that the packet is out of step, i.e. in case of normal reception, R=0, and when the synchronization with the wireless signal data stream carried by the peer end is lost, R=1. When the event that a predetermined number of packet are lost consecutively occurs at the receiving end, it is determined that the packets are out of step. At this time, the receiving end should notify the peer end of occurrence of the packet out-of-step through the link out-of-step indication bit of payload header of the reverse link, and the peer end may perform operations such as re-initializing the link and etc. to make the receiving end obtaining packet synchronization again. The pointer field is used for the synchronization of wireless frames and the measurement of round trip transmission latency (RTT), which will be explained in detail later.

Figure 7:
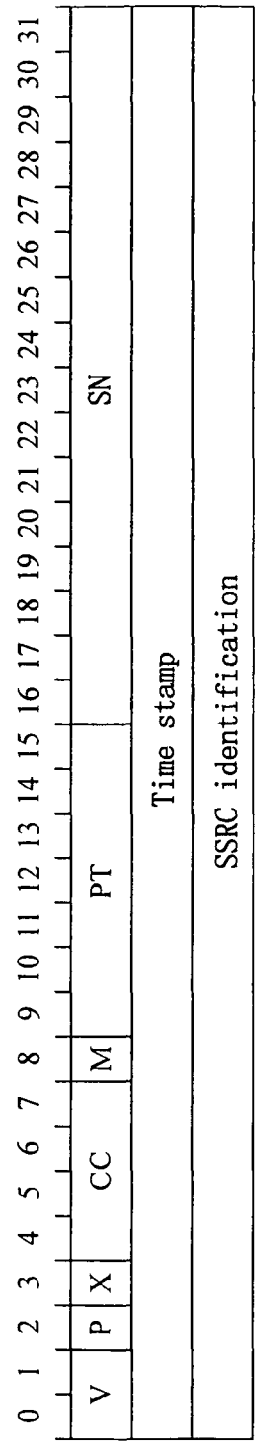
FIG. 7 shows a RTP header structure utilized in the embodiment of the present invention.

The structure of the RTP header is as shown in FIG. 7. The main function of the RTP layer in Radio Over Packet is to carry a real time wireless signal data stream. As stated above, the wireless signal data streams of different cells, different carrier frequencies and different wireless interface standards and systems in the same function node should be discriminated by different branches. However, the wireless signal data streams of the same cell, the same carrier frequency, the same wireless interface standard and system in the same function node may still be composed of wireless signals from a plurality of parallel channels, and a typical case is the application of the multiple antenna technique. In an actual wireless base station system, the multiple antenna technique is increasingly adopted to obtain an enhanced wireless performance, typically such as transmission diversity, reception diversity, multiple antenna transmitting/receiving (MIMO) and smart antenna or array antenna. In these wireless base station systems adopting the multiple antenna technique, there is a rigid time and phase relation between the antenna signals, requiring that the transmission latencies of antenna signals in the transmission procedure are exactly the same. Therefore, in case of multiple antenna technique, the wireless signal data streams of the same cell, the same carrier frequency, the same wireless interface standard and system in the same function node, which correspond to all the antennas of the same antenna group or array, may be carried on the same RTP stream.

The basic definitions on fields of RTP header as shown in FIG. 7 comply with IETF specifications "RFC1889, RTP: A Transport Protocol for Real-Time Applications", and its specific usage in the current embodiment is as follows:

V (version number): current RTP version number, set as 2;

P (padding indication bit): set as 0, i.e., no padding;

X (header extension indication bit): set as 0, i.e., no header extension;

CC (CSRC count): set as 0, i.e. no CSRC (contributing source);

M (identification bit): this bit and the pointer field of the payload header are used together for the synchronization of wireless frames and the measurement of round trip transmission latency (RTT), which will be explained in detail later;

PT (payload type): this field indicates different payload formats, and factors affecting the payload format comprise sampling rate, bit width of sampling value and number of parallel channels (antenna number). The sampling rate is a multiple of code cell or symbol rate of physical channel of a corresponding wireless interface, with typical value of 1~8. For example, in a CDMA (code division multiple access) system, the sampling rate is a multiple of the chip rate, and in a TDMA time division multiple access) system, the sampling rate is a multiple of the symbol rate; the sampling value bit width corresponds to the number of bits of the employed ADC/DAC (analog to digital conversion/digital to analog conversion), with typical value of 4~20; the number of parallel channels is the number of antennas, with typical value of 1~16. Since the PT field only has 7 bits and at most denotes 128 kinds of payload formats, for a specific wireless base station system, it is necessary to make further definitions according to the specific case;

Sequence number: since the IP/UDP layer is not in charge of the sequential transmission of packets, the sequence number may be used by the receiving party to detect the loss of a packet and to recover the packet sequence. Its specific usage complies with relevant prescriptions of IETF specification RFC 1889;

Time stamp: the time stamp indicates the sampling time of the first sampling value in the payload portion (when the payload is composed of a plurality of parallel channels, i.e., wireless signals of multiple antennas, the sampling time of the antenna signals are the same because of synchronously sampling all the parallel channels). As stated above, the sampling rate is a multiple of code cell or symbol rate of physical channel of the corresponding wireless interface. In a Radio Over Packet application, the time stamp can be used to measure the latency jitter. Usage about time stamp complies with relevant prescriptions of IETF specification RFC 1889;

SSRC (synchronization source identification): according to RFC 1889 relevant specifications, a RTP session (identified by a transport layer address, i.e., the combination of an IP address and a UDP port) may include a plurality of RTP streams from different sources, wherein each RTP stream is identified by a different SSRC value, and has an independent SSRC value and sequence number space. In the present invention, since uplink and downlink wireless signals of different cells (comprising sectors), different carrier frequencies and different wireless interface standards and systems employ different transport layer addresses, each session has only one RTP stream, i.e., only one synchronization source.

RTCP (RTP control protocol) is optional, and in a Radio Over Packet application, can be used to provide feedback information about transmission quality, such as packet lost rate, latency jitter and round trip transmission latency (RTT). Relevant usage complies with IETF specification "RFC 1889, RTP: A Transport Protocol for Real-Time Applications".

Figure 1B:
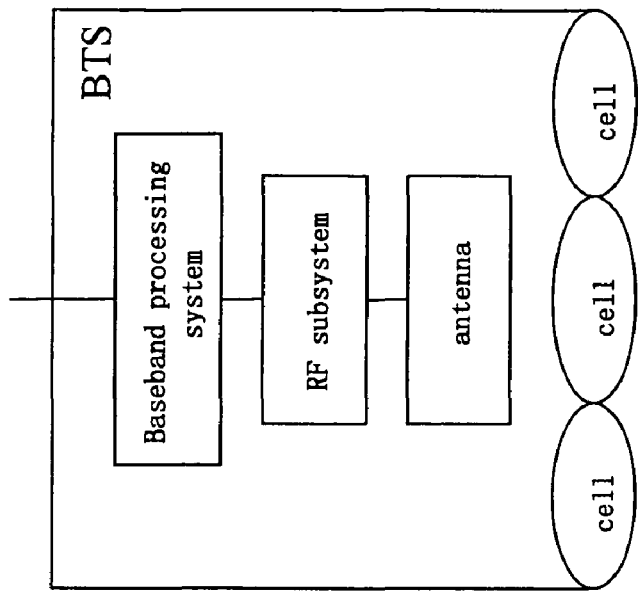
FIG. 1b is a schematic diagram showing the structure of a conventional base station.
Figure 1A:
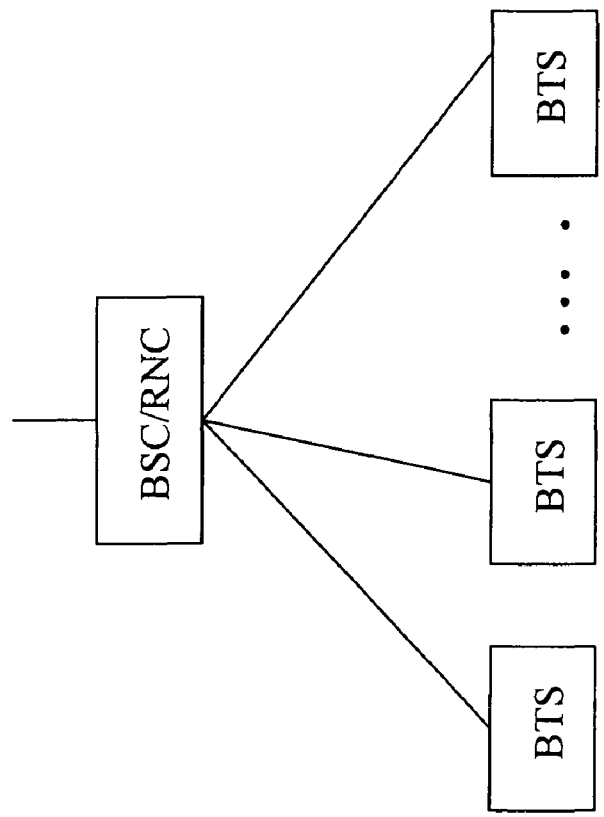
FIG. 1a is a schematic diagram showing the structure of a wireless access network.
Figure 2:
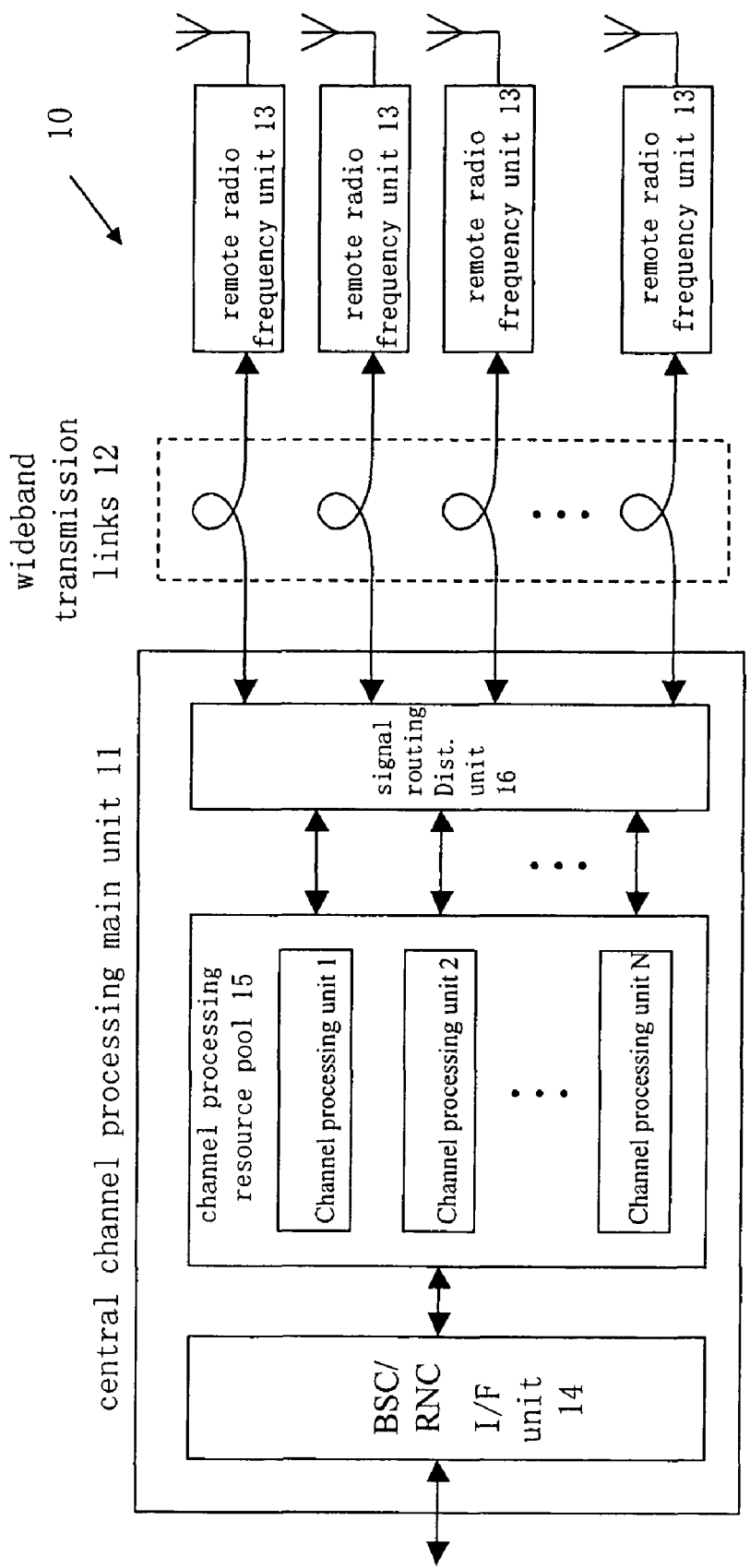
FIG. 2 is a block diagram showing the structure of a centralized base station system based on remote radio frequency units.
Figure 3B:
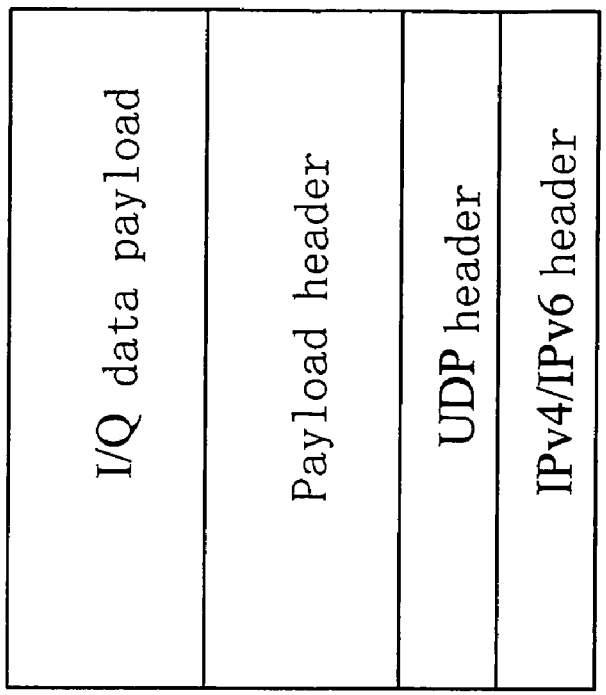
FIG. 3b shows an IP transmission encapsulating structure including no RTP layer according to an embodiment of the present invention.
Figure 3A:
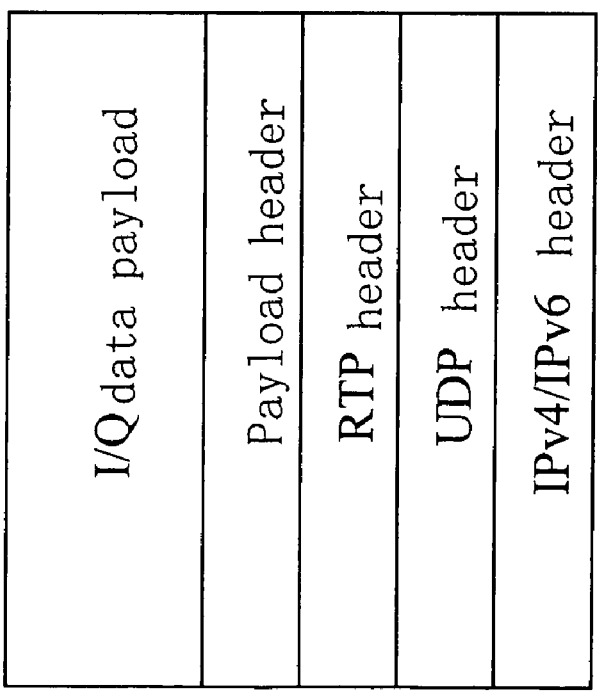
FIG. 3a shows an IP transmission encapsulating structure including a RTP layer according to an embodiment of the present invention.

The wireless signal network (e.g., IP) transmission encapsulating structure of the payload encapsulating and RTP encapsulating sublayers in the present embodiment is as shown in FIG. 3a.

For the RTP header and payload header in the above example; information relating to payload type, packet sequence number, wireless signal packet transmission link out-of-step indication (optional), wireless frame synchronization indication and corresponding wireless frame start position pointer is relevant to the object of the present invention, and other fields are not relevant to the scope of the present invention. In addition, the above specific formats and values are only exemplary, and have no limitation to the present invention. One skilled in the art may obtain other formats and limit values according to the description herein.

Figure 9:
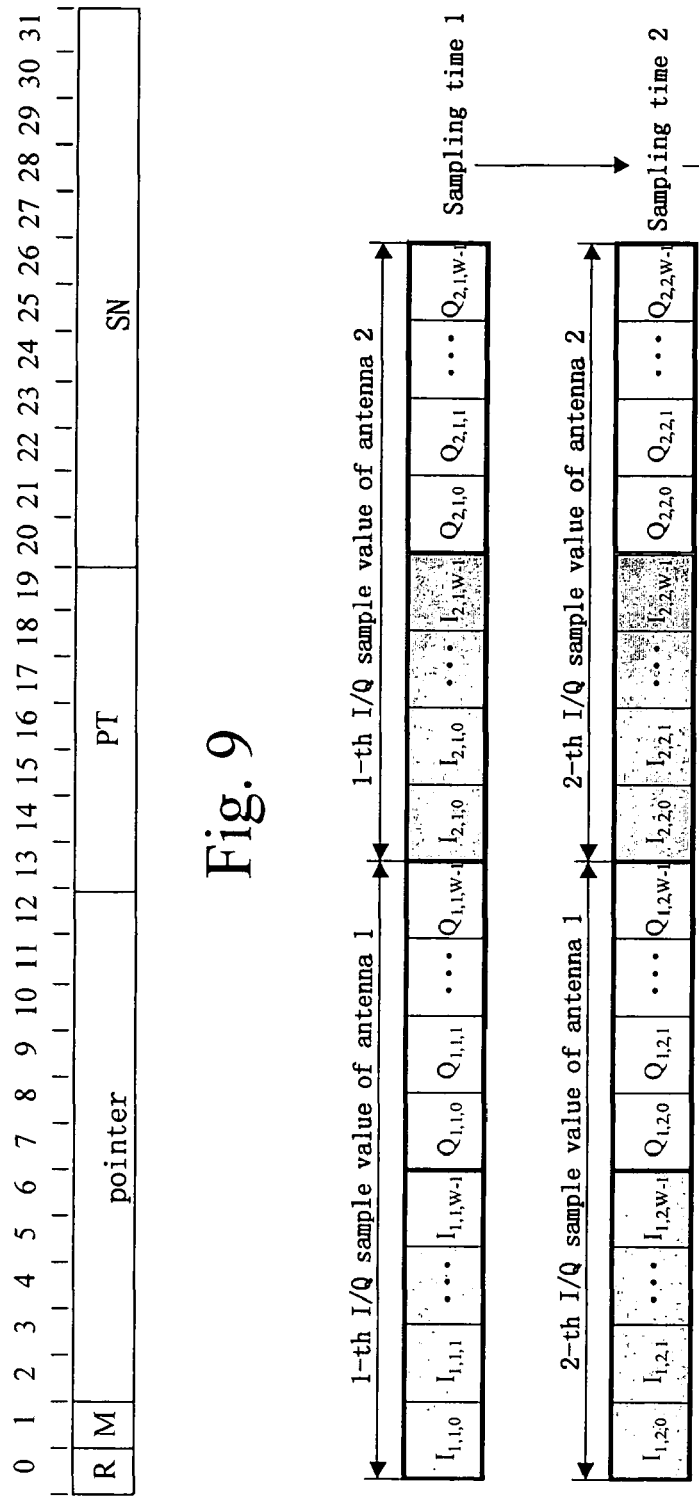
FIG. 9 shows a payload header structure utilized in a preferable embodiment of the present invention.

In another embodiment, a preferable payload header structure shown in FIG. 9 is employed, wherein the payload header provides important fields such as identification bit (M), sequence number, payload type (PT) and etc. which have the same function with the RTP header, thereby allowing to use a protocol (e.g., network protocol) below the application protocol, not the RTP layer, to directly carry the wireless signal data stream, and reducing processing overhead of the RTP layer and transmission bandwidth overhead of the RTP header. The wireless signal network (e.g., IP) transmission encapsulating structure for directly carrying the wireless signal data stream by for example the network protocol other than RTP layer is as shown in FIG. 3b. Actually, since each wireless signal data stream only has one synchronization source, when not using the RTP layer, the synchronization source identification field is not needed. Since the wireless signals are sampled at an equal interval and are transmitted in order of sampling, the network protocol packet (e.g., IP packet) of each carried wireless signal data stream have equal lengths, and therefore the time stamp field is not needed when not using the RTP layer. In this case, the RTP encapsulating unit is omitted, and main functions of the RTP protocol are integrated in payload encapsulating unit 23.

As shown in FIG. 9, besides providing the identification bit, sequence number and payload type fields having the same functions with the RTP header, there are also defined link out-of-step indication bit (R) and pointer field in the payload header. The link out-of-step indication bit is used to notify the peer end that the packet is out of step, i.e. in case of normal reception, R=0, and when the synchronization with the wireless signal data stream packet carried by the peer end is lost, R=1. When the event that a predetermined number of packet are lost consecutively occurs at the receiving end, it is determined that the packets are out of step. At this time, the receiving end should notify the peer end of occurrence of the packet out-of-step through the link out-of-step indication bit of payload header of the reverse link, and the peer end may perform operations such as re-initializing the link and etc. to make the receiving end obtaining packet synchronization again. The pointer field and the identification bit (M) are used together for the synchronization of wireless frames and the measurement of round trip transmission latency (RTT), which will be explained in detail later.

Returning to FIG. 14a, at step S14, network protocol transmission processing section 28 performs processing on the application protocol packets generated by application protocol transmission processing section 27.

In one embodiment, network protocol transmission processing section 28 comprises UDP encapsulating unit 24 and IP encapsulating unit 25. The processing method of the embodiment is as shown in FIGS. 3a and 3b. FIGS. 3a and 3b respectively show a network protocol encapsulating method for the wireless signal IP transmission (Radio over IP) including the RTP layer in the IP network, and a network protocol encapsulating method for the wireless signal IP transmission (Radio over IP) not including the RTP layer in the IP network. In the wireless signal IP transmission encapsulating structure as shown in FIG. 3a, the top layer is I/Q data payload, and the following layers are payload header, RTP (real time transmission protocol) header, UDP (user datagram protocol) header and IPv4 or IPv6 header respectively.

The source address and destination address of IP layer is IP addresses of the transmitting end and receiving end respectively. The transmitting end and receiving end of the present invention may be the following function nodes: RRU in the base station system based on remote radio frequency units, MU in the base station system based on remote radio frequency units, wireless base station having load-sharing structure and etc. In addition, as described below, the IP packet payload portions of each carried wireless signal data stream have the same size, and therefore the IP packets of each carried wireless signal data stream have equal lengths.

Figure 6:
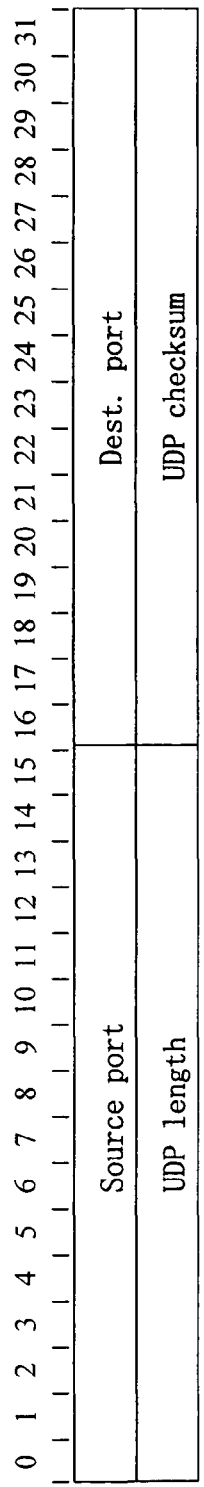
FIG. 6 shows a UDP header structure utilized in the embodiment of the present invention.

The structure of the UDP header is as shown in FIG. 6. The main function of the UDP layer in Radio over IP is multiplexing. There may be multiple different wireless signals in the same function node, such as wireless signals of different cells (comprising sectors) in the same function node, wireless signals of different carrier frequencies in the same cell, wireless signals of different wireless interface standards and systems in the same function node, and etc. For respective wireless signals in the same function node, they need to be addressed and be differently processed respectively. For example, in the uplink direction, it is needed to perform channel processing by different modules or units on the uplink signals of different cells (comprising sectors), different carrier frequencies and different wireless interface standards and systems, and in the downlink direction, it is needed to transmit, by different radio frequency channels, the downlink signal of different cells (comprising sectors), different carrier frequencies and different wireless interface standards and systems. Therefore, the transport layer is needed to provide different addresses for discriminating so as to perform corresponding processings. Therefore, the uplink and downlink wireless signals of different cells (comprising sectors), different carrier frequencies and different wireless interface standards and systems are discriminated and addressed by the combination of IP address and UDP port. The usage of other fields in the UDP header complies with IETF specification "RFC 768, User Datagram Protocol".

In one alternative embodiment, network protocol transmission processing section 28 comprises a MPLS virtual circuit label marking unit for marking MPLS virtual circuit label and a MPLS tunnel label marking unit for marking MPLS tunnel label.

Figure 4B:
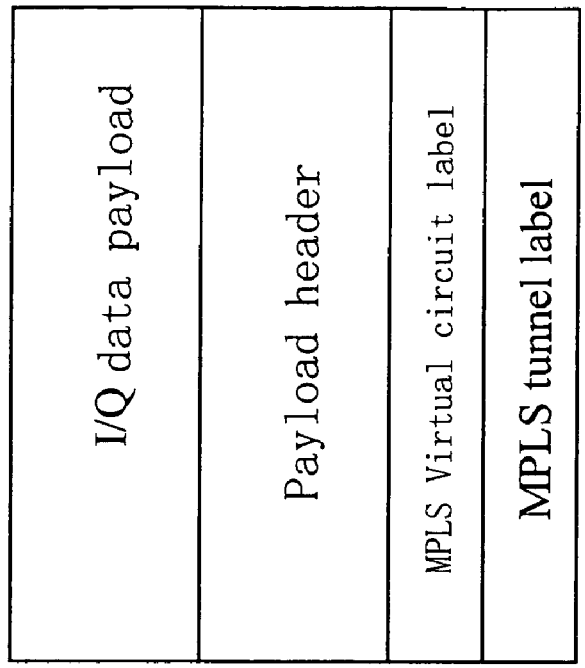
FIG. 4b shows a MPLS transmission encapsulating structure including no RTP layer according to an embodiment of the present invention.
Figure 4A:
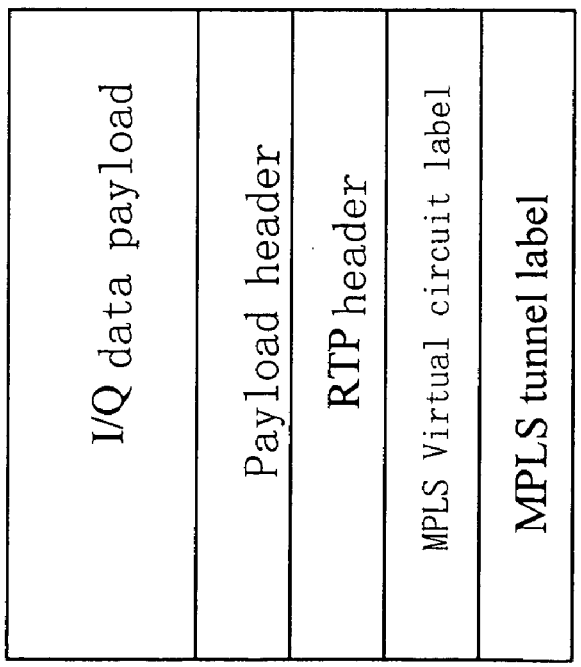
FIG. 4a shows a MPLS transmission encapsulating structure including a RTP layer according to an embodiment of the present invention.

Because of its fast switch ability, scalability, ease of implementing QoS (quality of service) management and traffic engineering, MPLS (multiple protocol label switch) technique has become an effective solution for building a large scale wideband packet network. For its relevant technique, it is possible to refer to relevant specifications of RFC 3031, RFC 3032, RFC 3036 and etc. of IETF. FIGS. 4a and 4b respectively show wireless signal packet transmission (Radio over MPLS) including the RTP layer in the MPLS network, and wireless signal packet transmission (Radio over MPLS) not including the RTP layer in the MPLS network. As shown in FIG. 4a, if the transmitting party (e.g., MU) and the receiving party (e.g., RRU) both support label distribution protocol (LDP) of MPLS or through statically configuring label switch path (LSP) of MPLS, it is possible to directly carrying RTP on MPLS. In the wireless signal MPLS transmission encapsulating structure as shown in FIG. 4a, respective layers from top to bottom are I/Q data payload, payload header, RTP header, MPLS virtual circuit label and MPLS tunnel label including one or more labels in order. Similar to IP transmission, FIG. 4b shows an encapsulating structure not using RTP layer, but directly carrying the wireless signal data stream over MPLS.

Figure 8:
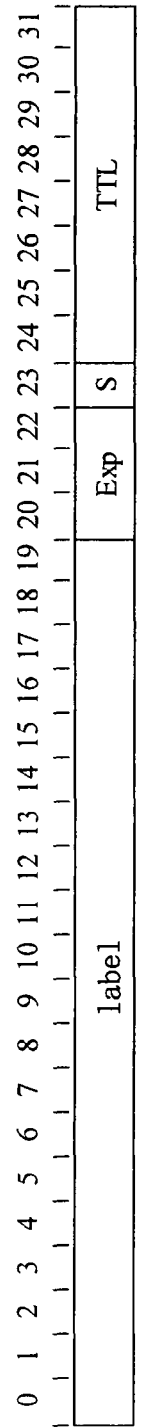
FIG. 8 shows a MPLS label entry structure utilized in the embodiment of the present invention.

The label of MPLS is a label stack composed of one or more labels. FIG. 8 shows the structure of one label entry of a usual MPLS label stack. For the definition and usage about respective fields, please refer to IETF specification "RFC 3032, MPLS Label Stack Encoding". In FIGS. 4a, 4b, the MPLS tunnel label is used for identifying the connection between the MU in the base station system based on remote radio frequency units and respective RRUs, and between the wireless base stations having load-sharing structure, the MPLS virtual circuit label has a function of multiplexing, and is used for discriminating the uplink and downlink wireless signals of different cells (comprising sectors), different carrier frequencies and different wireless interface standards and systems in the same connection.

Figure 5B:
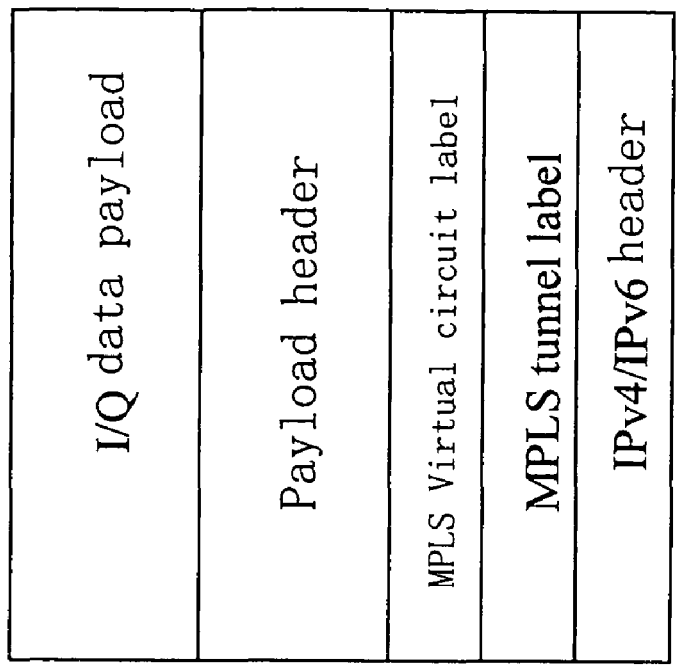
FIG. 5b shows a MPLS-in-IP transmission encapsulating structure including no RTP layer according to an embodiment of the present invention.
Figure 5A:
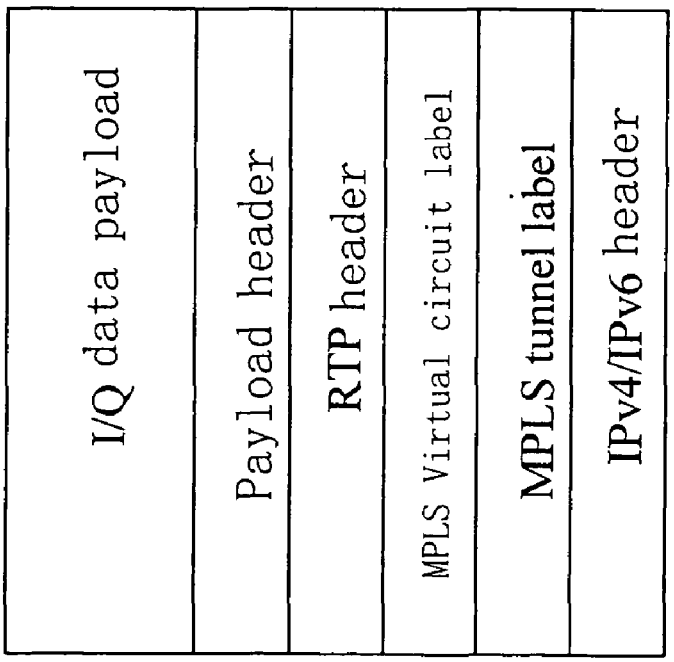
FIG. 5a shows a MPLS-in-IP transmission encapsulating structure including a RTP layer according to an embodiment of the present invention.

In another alternative embodiment, by using the MPLS-in-IP mixed wireless signal packet transmission encapsulating structure as shown in FIGS. 5a, 5b, such an encapsulating structure is applicable for the application of performing wireless signal packet transmission via a mixed network of MPLS and IP. In the embodiment, the network protocol transmission processing section comprises a MPLS virtual circuit label marking unit for marking MPLS virtual circuit label, a MPLS tunnel label marking unit for marking MPLS tunnel label and a unit for performing IP protocol encapsulating. In the encapsulating structure, the source address and destination address of IP layer below the MPLS tunnel label also correspond to the IP addresses of the transmitting end and receiving end respectively. The transmitting end and receiving end may be the following function nodes: RRU in the base station system based on remote radio frequency units, MU in the base station system based on remote radio frequency units, wireless base station having load-sharing structure and etc. For detailed description on MPLS-in-IP, it is possible to refer to IETF RFC "MPLS Label Stack encapsulation in IP, draft-worster-mpls-in-ip-5, Jul. 2001".

It is to be noted that, for different wireless signal branches corresponding to different cells, carrier frequencies and wireless interface standards within said function node, different UDP ports (or MPLS virtual circuit labels) are used.

Finally, the IP (or MPLS) packet of respective branches for carrying wireless signals and the IP (or MPLS) packets for carrying management control class information are transmitted via transmission scheduling unit 26, wherein transmission scheduling unit 26 applies the scheduling based on the same priority, such as circularly scheduling, to the IP (or MPLS) packets of respective branches for carrying wireless signals, and applies a lower transmission priority to the IP (or MPLS) packets for carrying management control class information.

Returning to FIG. 14a again, at step S16, the final packets are transmitted through the transmitting port. Then return to step S10.

Figure 13B:
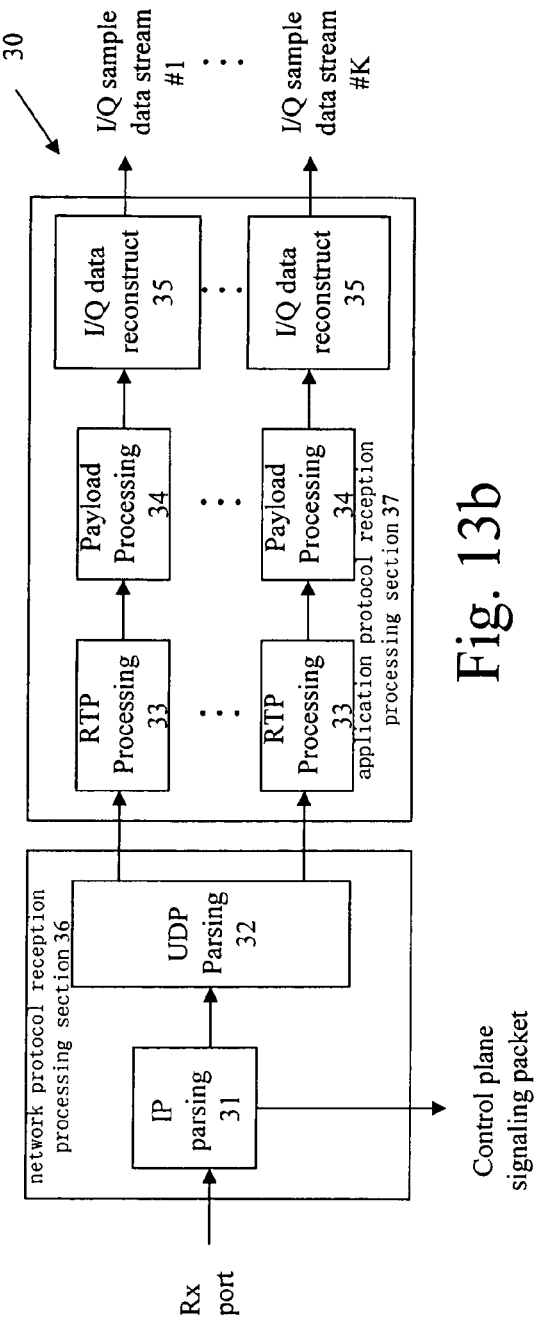
FIG. 13b is a schematic block diagram for illustrating a wireless signal packet receiving system according to an embodiment of the present invention.

FIG. 13b is a schematic block diagram for illustrating wireless signal packet receiving system 30 according to an embodiment of the present invention. System 30 comprises network protocol reception processing section 36 and application protocol reception processing section 37.

The flow chart of FIG. 14b shows the reception processing of system 30. As shown in FIG. 14b, at step S20, system 30 receives network protocol (e.g., IP or MPLS) packets from the receiving port. The network protocol packets are generated after being processed by the above system 20.

Then at step S22, network protocol reception processing section 36 performs processing on the received network protocol (e.g., IP or MPLS) packets to obtain application protocol packets therein. In the present embodiment, the received network protocol packets are IP packets after protocol encapsulating as shown in FIGS. 3*a*, 3*b*. Network protocol reception processing section 36 comprises IP parsing unit 31 for processing IP header and extracting UDP packets, and UDP parsing unit 32 for processing UDP header and extracting application protocol packets. Since step S22 is the processing in opposite direction to step S14, no specific description will be performed on the repetition portions. In one alternative embodiment, the received network protocol packets are network protocol packets after protocol encapsulating as shown in FIGS. 4*a*, 4*b*. Network protocol reception processing section 36 correspondingly comprises a unit for processing MPLS tunnel labels, and a unit for processing MPLS virtual circuit labels. In another alternative embodiment, the received network protocol packets are network protocol packets after protocol encapsulating as shown in FIGS. 5*a*, 5*b*. Network protocol reception processing section 36 correspondingly comprises a unit for processing IP headers and extracting MPLS packets, a unit for processing MPLS tunnel labels and a unit for processing MPLS virtual circuit labels. At step S22, the network protocol packet received by different function nodes are processed by corresponding units in network protocol reception processing section 36, the packets for carrying the above management control class information are identified according to different transport layer protocol or transport layer address, and the rest packets are demultiplexed with respect to different wireless signal branches corresponding to different cells, carrier frequencies and wireless interface standards within the same function node according to UDP port or MPLS virtual circuit label, i.e., separating packet data streams of said branches, and output to corresponding reception paths in application protocol reception processing section 37.

Then, at step S24, the packets of respective branches are further processed in corresponding processing paths in application protocol reception processing section 37. In one embodiment, the processing path of application protocol reception processing section 37 comprises RTP processing unit 33, payload processing unit 34 and I/Q data reconstructing unit 35, wherein the application protocol packets correspond to the application protocol packets generated at step S12 based on the manner including RTP layer, and the processings of RTP processing unit 33 and payload processing unit 34 are in opposite direction to that of RTP encapsulating unit 23 and payload encapsulating unit 22. In the processing of RTP processing unit 33, corresponding processings are performed simultaneously by using the information carried by the RTP header and payload header fields, wherein the received packets are re-sorted by using the packet sequence number at the receiving end, and at the same time, the packets discarded by the packet network intermediate nodes or receiving end because of timeout are padded with padding data (typically, corresponding I/Q sampling signal are padded with 0), thereby ensuring sequential transmission of I/Q wireless signals. In addition, the transmitting and receiving ends perform the above functions including wireless frame synchronization, RTT estimation, RRU latency correction, wireless signal packet transmission link out-of-step detection and etc. by using the information such as wireless signal packet transmission link out-of-step indication, wireless frame synchronization indication, corresponding wireless frame start position pointer and etc. carried by the above corresponding RTP header and payload header fields. Finally, RTP processing unit 33 and payload processing unit 34 process the application protocol packet to obtain I/Q data payload segments and output to I/Q data reconstructing unit 35. I/Q data reconstructing unit 35 recovers and reconstructs the I/Q data stream, wherein in case where there are multiple parallel channels in the multiple antenna system and etc., it is possible to correctly separate wireless signal I/Q sample data streams of respective parallel channels.

In one alternative embodiment, RTP processing unit 33 may be omitted. At this time, the application protocol packet contain no RTP header, but contains payload header as shown in FIG. 9. Payload processing unit 34 includes main function of RTP processing unit 33.

Figure 11:
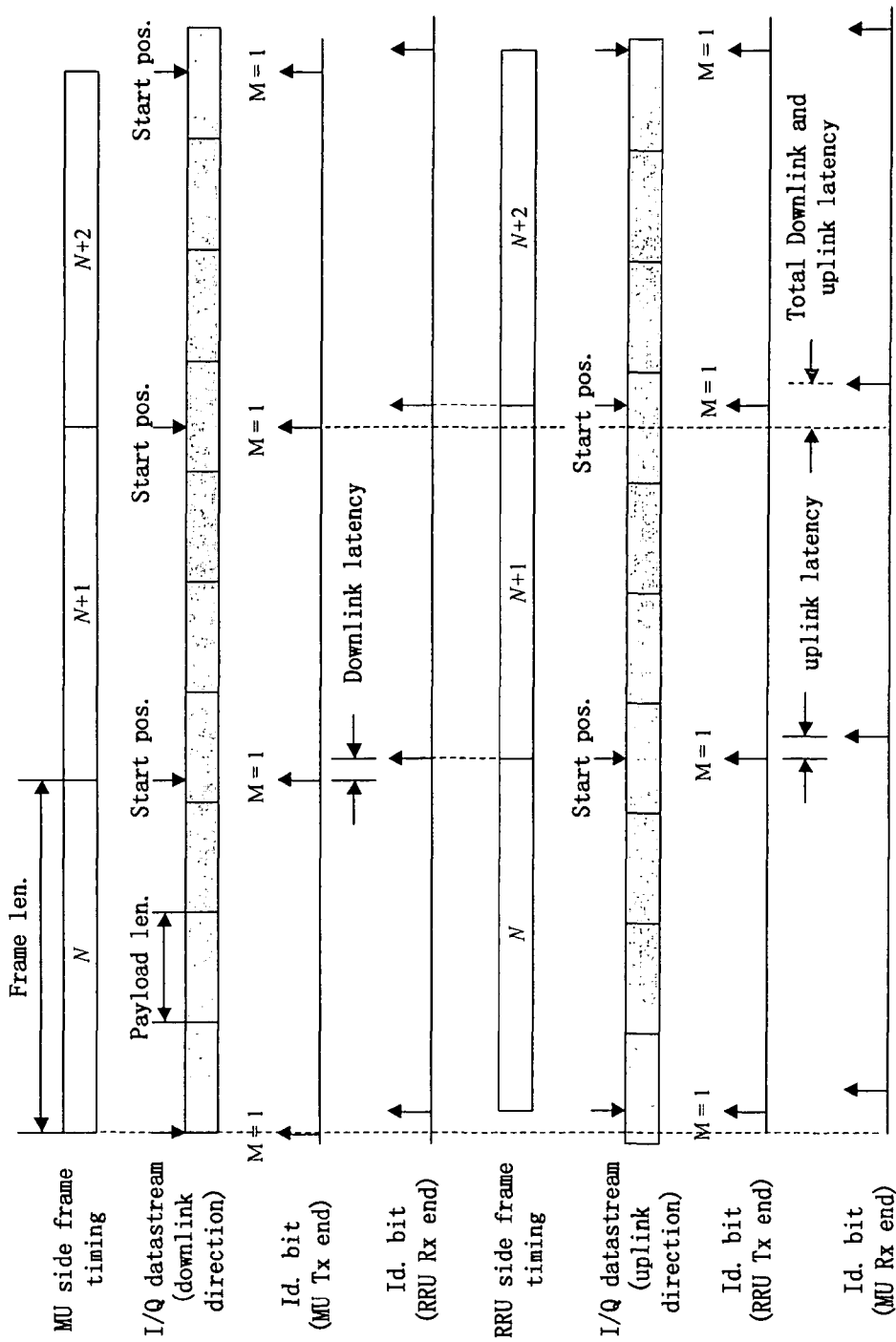
FIG. 11 schematically illustrates the measurement of the wireless frame timing and RTT.

When the transmitting party is MU and the receiving party is RRU, or when the transmitting party is a base station and the receiving party is another base station, at step S24, the wireless frame timing recovery function is also performed according to the received data streams. As stated above, the identification bits of RTP header and payload header and the payload header pointer field are jointly used for the synchronization of wireless frame and the measurement of round trip transmission latency (RTT), with its principle being as shown in FIG. 11.

By taking a base station system based on remote radio frequency units as an example, the wireless frame timing at the MU side is a timing reference for all the RRUs connected therewith. In the downlink direction, the MU segments the downlink I/Q baseband signal sampling sequence at a fixed payload length and encapsulates them into packets of fixed length to transmit to respective RRU (for the convenience of description, the packet payload length and the wireless frame length are both expressed as multiples of one sampling time interval). When the sampling time of a sampling point in the segments of the downlink I/Q baseband signal sampling sequence encapsulated in a packet payload portion is the same as the start time of a wireless frame, the identification bit of the packet payload header (if using RTP, then including RTP header) M=1. At the same time, the pointer field of the packet payload header points to the sampling position of said sampling point having the same sampling time as the wireless frame start time, i.e., the value of the pointer field is the number of sampling points in the interval from the first sampling point in the packet payload portion to that sampling point. Since the wireless frame length is not always an integral times of the packet payload length, the packet payload position to which the start position of each wireless frame corresponds is changing. As will be readily seen, the above operation actually mark the timing of wireless frames by using the I/Q baseband signal sampling sequence itself as time coordinates.

For example, after the RRU receives the packets for carrying the segments of the downlink I/Q baseband signal sampling sequence from the MU, at the same time of sequentially reconstructing the I/Q baseband signal sampling sequence, the wireless frame timing may be recovered by using the information of the above identification bit and pointer field.

After step S24, the obtained I/Q data stream are output at step S26, and then the process returns to step S20.

Based on the above transmitting and receiving embodiments, the estimation of RTT and RRU latency correction are provided. As compared to the wireless frame timing at the MU side, the wireless frame timing recovered at the RRU side has a certain delay. The delay comprises the packing latency of the packet for marking the wireless frame start position and its downlink transmission latency, wherein the packing latency is the time in the MU from the wireless frame start time to the sampling time of the last one sampling point in the packet payload portion. Because it must at least wait for this period of time to be able to encapsulating the packet and send it out, and this packing latency is known, it is possible to use the value of pointer field and packet payload length to calculate the packing latency. If the value of payload portion pointer field of the packet for marking the wireless frame start position is $P^{DL}$, the number of sampling points in the I/Q data payload encapsulating of the downlink direction is $S^{DL}$, and the sampling time interval of the downlink direction is $T_s^{DL}$, then the packing latency of the downlink direction is:

$$\tau_p^{DL} = (S^{DL} - P^{DL}) \cdot T_s^{DL} \quad (3)$$

By performing correction on the above changed packing latency and performing smoothing process by using the periodicity of wireless frame timing (if the downlink wireless frame is repeatable periodically, the most wireless access techniques have this characteristic), it is possible to obtain accurate wireless frame timing at the RRU side.

In the uplink direction, the RRU also segments the uplink I/Q baseband signal sampling sequence at a fixed payload length and encapsulates them into packets of fixed length and sends them to the MU. When the sampling time of a sampling point in the segments of the uplink I/Q baseband signal sampling sequence encapsulated in a packet payload portion is the same as the frame start time of the wireless frame timing obtained by the RRU, the identification bit of the packet payload header (if using RTP, then including RTP header) M=1. At the same time, the pointer field of the packet payload header points to the sampling position of said sampling point having the same sampling time as the wireless frame start time, i.e., the value of the pointer field is the number of sampling points in the interval from the first sampling point in the packet payload portion to that sampling point. Also, since the wireless frame length is not always an integral times of the packet payload length, the packet payload position to which the start position of each wireless frame corresponds is changing.

After the MU receives the packets for carrying the segments of the uplink I/Q baseband signal sampling sequence from the RRU, at the same time of sequentially reconstructing the I/Q baseband signal sampling sequence, the time of the wireless frame start point fed back by the RRU may be determined by using the information of the above identification bit and pointer field. Also, the time has a certain delay relative to the time of the wireless frame start point in the RRU. The delay comprises the packing latency of the packet for marking the wireless frame start position and its uplink transmission latency, wherein the packing latency is the time in the RRU from the wireless frame start time to the sampling time of the last one sampling point in the packet payload portion. If the value of payload portion pointer field of the packet for marking the wireless frame start position is $P^{UL}$, the number of sampling points in the I/Q data payload encapsulating of the downlink direction is $S^{UL}$, and the sampling time interval of the downlink direction is $T_s^{UL}$, then the packing latency of the uplink direction may be calculated by the following equation:

$$\tau_p^{UL} = (S^{UL} - P^{UL}) \cdot T_s^{UL} \quad (4)$$

Thus, in the MU, by using the difference $\tau_\Sigma$ between the time of the wireless frame start point fed back by the RRU and the time of its original wireless frame timing start point, as well as equation (3) and equation (4), it is possible to obtain an estimation of round trip transmission latency (RTT):

$$RTT = \tau_d^{DL} + \tau_d^{UL} = \tau_\Sigma - \Sigma_p^{DL} - \tau_p^{UL} \quad (5)$$

Wherein $\tau_d^{DL}$ and $\tau_d^{UL}$ are downlink direction transmission latency and uplink direction transmission latency respectively.

As compared to perform measurement by using RTCP, measuring RTT by using the above technique avoids complexity of RTCP processing and is applicable to the case not using RTP layer. At the same time, since performing periodical measurement, it is possible to track the real time change of RTT and perform smoothing processing by using periodicity to obtain a RTT measuring result of higher accuracy.

The reason for the RRU to obtain the wireless frame timing is that, since the radio frequency modules of RRU (radio frequency power amplifier, frequency synthesizing unit and etc.) often need the periodical control signal taking the wireless frame timing as timebase and having rigid timing requirement for operations such as on-off control relevant to the radio frequency modules, mode switch, transmitting and receiving switch in the TDD (time division duplexing) system and etc., the RRU may use the obtained wireless frame timing to locally and periodically generate the above signals (respective control signal start and stop time may be parameters configured and modified by control plane signaling).

For wireless interface technique of TDD mode, it is necessary to guarantee that respective RRUs perform uplink reception and downlink transmission in exact synchronization. Because the out-of-step of uplink and downlink transmitting and receiving timing of respective cells in the TDD system will cause mutual interference between transmitting and receiving slots of different cells, and cause affection on the adjustment for timing advancing in the handoff, it is necessary to guarantee the synchronization of respective RRU wireless frame timings. For discussion about the cell synchronization problem in TDD mode, please refer to literature "TR25.836, NodeB Synchronisation for TDD" of 3GPP (third generation cooperation project). For the wireless interface technique of FDD (frequency division duplexing) mode, if the wireless frames of respective cells are not required to be in rigid synchronization, the RRU latency correction operation may not be performed, and if required, the RRU latency correction will also be performed.

As stated above, the wireless frame timings obtained by respective RRUs based on the above method are different, and this difference is caused by different transmission latencies. To this end, according to the present invention, the MU may relatively advance or delay the wireless frame timings sent out to respective RRUs by using the obtain RTT measurements of respective RRUs. I.e., relatively increase or reduce the value of payload portion pointer field in the packet for marking the wireless frame start position in the downlink direction, so that the wireless frame timings of respective RRUs tend to be equal, thereby keeping tracking RTT change of respective RRUs and maintaining the synchronization of wireless frame timings of respective RRUs.

Figures 12A, 12B:
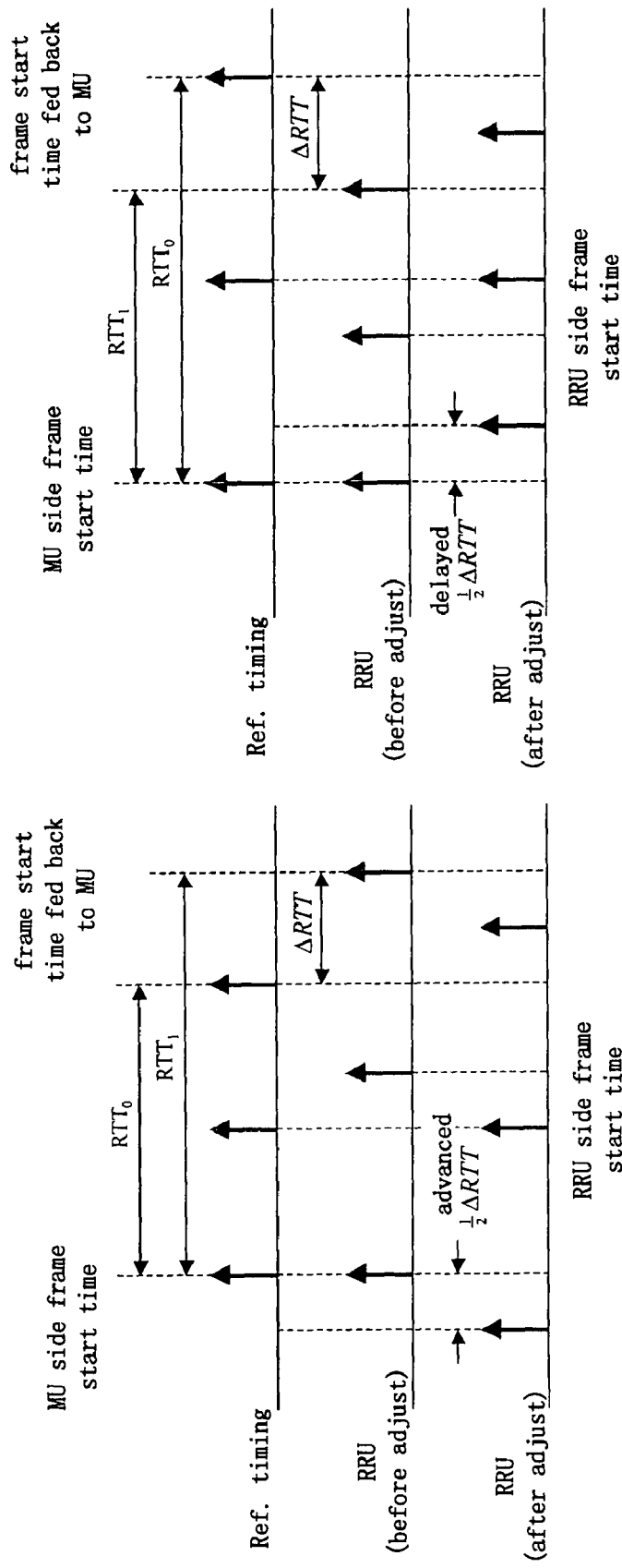
FIGS. 12a, b show schematic diagrams of RRU latency correction.

FIGS. 12a and 12b shows schematic diagrams of latency correction based on RTT measurement. As shown in the figures, the top is reference timing, the middle is the timing before latency correction in a RRU, and the bottom is the timing after latency correction in the RRU. As shown in the figures, the left arrows indicate frame start times at the MU side corresponding to respective RRUs, the middle arrows indicate frame start times received at the RRU side, and the right arrows indicate frame start times fed back to the MU by the RRUs. The round trip transmission latency of reference timing is RTT0, and the round trip transmission latency of RRU is RTT1. In FIG. 12a, RTT1 of RRU is larger than reference timing RTT0 by $\Delta RTT = RTT_1 - RTT_2 > 0$, and therefore the MU needs to advance the frame start time directed to the RRU by ½ΔRTT, thereby ensuring that the frame start time received at the RRU side aligns with the reference timing. In contrast, in FIG. 12b, RTT1 of RRU is smaller than reference timing RTT0 by ΔRTT=RTT$_1$−RTT$_2$>0, and therefore the MU needs to delay the frame start time directed to the RRU by ½ΔRTT, thereby ensuring that the frame start time received at the RRU side aligns with the reference timing.

Actually, in the above latency correction operation, it is assumed that the uplink and downlink transmission latencies are equal, and this is applicable to most applications. If the uplink and downlink transmission latencies of a specific application are not equal, it is possible to increase the advance amount or delay amount for the wireless frame timings sent to respective RRUs by a correction factor, i.e., the modification is ½(1+γ)ΔRTT, wherein −1<γ<1. The correction factor may be determined by experimental values obtained through actual measurements. In addition, the reference timing in the above latency correction operation is a reference for all the RRUs to perform latency correction, but the selection of its value has no affection on relative timing synchronization of respective RRUs, and has affection on average frame start time at the MU side corresponding to respective RRUs. Therefore, the above reference timing is determined by the average frame start time at the MU side corresponding to respective RRUs.

Although a method of latency measurement and correction has been described in an example where the MU is transmitting party and the RRU is receiving party, one skilled in the art will understand that, such a method may be applied to any transmitting party and receiving party using the transmitting and receiving method of the present invention as required, and according to the specific definition on the synchronization object and the synchronization condition, it is possible to send a timing adjustment correspondingly.

Among the QoS (quality of service) performance parameters such as transmission latency, latency jitter, packet loss and etc. in wireless signal packet transmission, the transmission latency is an important factor affecting the transmission quality of wireless signal packets. Because the wireless interface technique is increasingly employing feedback control technique such as fast closed loop power control, closed loop transmission diversity, mixed type ARQ (Automatic Retransmission Request) and etc. in physical layer, it is necessary to reduce inherent latency of the feedback control loop as far as possible in order to increase feedback control performance, and therefore the uplink and downlink transmission latencies should be reduced as possible in the wireless signal packet transmission.

The transmission latency of packet transmission is mainly composed of packet packing latency and network transmission latency, wherein the packet packing latency is determined by packet length, and the network transmission latency is mainly determined by packet forward latency of the switch/routing node in the network. In addition, the latency jitter also affects the total latency, because the receiving end needs to buffer packets to eliminate the latency jitter, and the larger the latency jitter is, the longer the latency induced by reception buffering is. According to the present invention, to reduce the transmission latency, latency jitter and etc. (improving QoS performance), it is possible to employ the following methods:

1) By trade off between increasing transmission efficiency and reducing transmission latency, selects the most suitable packet length, i.e., the segment length of wireless signal data stream of the packet payload portion. Besides statically configuring the packet length, it is also possible to dynamically change the packet length according to the actually measured transmission latency or RTT, to meet a certain transmission latency requirement;

2) Since the amount of uplink and downlink data streams in the wireless signal packet transmission is relatively fixed and known, it is possible to perform planning and optimization on the transmission path of traffic and the packet forward policy of switch/routing nodes in networking and network configuration, thereby reducing the transmission latency and latency jitter as far as possible. This measure is in particular applicable to the transmission scheme based on MPLS;

3) Since besides the traffic relevant to the wireless signal packet transmission in the network, there still are other traffic (at least comprising link control management packets for the wireless signal packet transmission itself), the control mechanism of QoS, typically such as dividing of DiffServ (discriminating service), FEC in MPLS (forward equivalent class) and etc., should be used to set the packets carrying wireless signal data stream at a QoS level as high as possible, thereby ensuring its QoS performance;

4) In wireless signal packet transmission, besides the packets for carrying wireless signal data stream, there are other packets, including a variety of management control packets such as Radio Over Packet link control and management, RTCP, LDP, RRU operation maintenance and etc. To ensure the QoS performance of wireless signal data stream transmission, the packet scheduling based on priority should be performed when the transmitting end of Radio Over Packet link transmits packets, to ensure that the packets for carrying wireless signal data stream are transmitted with the most preference.

As noted earlier, it is possible to use relevant fields of payload header and RTP header, RTCP and etc. to perform real time monitoring on the QoS performance such as transmission latency (equivalently, RTT), latency jitter, packet loss and etc. Once there is an abnormity, it is possible to perform corresponding abnormity processing and adaptive processing, thereby ensure the QoS performance of wireless signal packet transmission.

In a mobile communication system, the requirement to the frequency stability of radio frequency units in a base station is high, and often needs a precision of 0.05 ppm. Therefore, the RRU needs to obtain a frequency reference of high stability. At the same time, since the digital wireless signal data stream is transmitted to the receiving end via packets in the wireless signal packet transmission, the original bit timing information will be lost after the packet transmission. To rebuild the wireless signal data stream at the receiving end, it is necessary to recover or obtain the bit timing information of the digital wireless signal data stream. In addition, in the wireless base station supporting load-sharing structure, it is usually not needed to perform clock recovery, because the base stations may obtain synchronous clock signal of high stability through the existing technique.

In the base station system based on remote radio frequency units, the MU is always able to obtain a frequency reference of high stability, and the RRU needs to recover or obtain a clock of high stability in synchronization therewith. On the one hand, the required frequency reference is provided to the radio frequency section, and on the other hand, the downlink digital wireless signal data stream is rebuilt and used for generating the uplink direction wireless signal data stream. To this end, it is possible employ two different methods to obtain the bit timing of digital wireless signal data stream and the frequency reference of high stability required by the RRU. One is to adopt a global common clock. A typical implementation method is that the MU and the respective RRUs all obtain a frequency reference of high stability from GPS (global positioning system), and take it as a sampling clock source for the digital wireless signal data stream. Another is to adopt an adaptive clock recovery technique which utilizes the feature of constant bit rate of the transmitted continuous data stream to recover the clock of the constant data stream through a phase locked loop (PLL). United States patent "U.S. Pat. No. 6,731,649, TDM over IP (IP Circuit Emulation Service)" employs such a technique.

In the base station system based on remote radio frequency units, between the RRU and the MU, besides the digital wireless signal data stream, there is corresponding management control class information, and it is also transmitted by the packet network:

1) Radio Over Packet link control, management and maintenance signaling, including control signaling such as link establishment, modification and deletion, operation mode negotiation, rate negotiation, payload format negotiation, link monitoring and etc.;

2) Parameter setting, state monitoring, alerting and etc. of respective radio frequency modules of RRU;

3) Operation maintenance information of RRU, such as software/firmware upgrade, configuration management and etc.;

4) Protocols relevant to packet transmission technique, such as RTCP, LDP, IGMP (Internet group management protocol), control protocols relevant to QoS and etc.

Radio Over Packet link control, management and maintenance signaling and operation maintenance information of RRU can typically be carried in dedicated control protocol over TCP (transmitted control protocol)/IP, and it is also possible to carry them in SNMP (simple network management protocol) over UDP/IP and define corresponding MIB (management information base), and operation maintenance information of RRU may typically be carried in SNMP over UDP/IP.

As known by one skilled in the art, the above specific formats, values and embodiments are only exemplary, and have no limitation to the present invention. One skilled in the art may obtain other modified embodiments and variations according to the description herein.

I claims:

1. A method of transmitting one or more branches of wireless signals between a channel processing unit and a remote radio frequency unit in a centralized base station, or between base stations through a packet network, each of said branches of wireless signals being a signal flow having a wireless frame period, the method comprising steps:

obtaining a sample data stream of wireless signal of each branch in said wireless signals;

dividing said sample data stream into consecutive data segments of fixed length;

encapsulating said data segments into application protocol packets according to a predetermined protocol, each application protocol packet further including first information indicating the sequence of the data segment of the packet in all the data segments of the branch to which the data segment belongs; second information indicating payload type of the branch; third information indicating whether the data segment of the packet contains a data sample corresponding to the start of a wireless frame period; and fourth information indicating the position of the data sample in the data segment if the third information indicates that the data sample corresponding to the start of the wireless frame period is contained; and encapsulating the generated application protocol packets into network protocol packets according to a network transport protocol and transmitting them to a specified target, wherein the network protocol packet further includes fifth information identifying one of said one or more branches to which the packet belongs, said fifth information and network transport source address and destination address uniquely distinguishing said branches.

2. The method of claim 1, wherein each said branch comprises a wireless signal data stream belonging to the same function node, the same cell, the same carrier frequency, the same wireless interface standard and system.

3. The method of claim 2, wherein at least one branch comprises wireless signals of a plurality of parallel channels, and sample data of the at least one branch is simultaneous sample data of wireless signals of the plurality of parallel channels.

4. The method of claim 1, wherein said step of encapsulating into network protocol packets according to a network transport protocol comprises:

encapsulating the application protocol packets into UDP packets of fixed length according to a user datagram protocol UDP, wherein the UDP packet header comprises source port number and destination port number forming the fifth information; and encapsulating the UDP packets into network protocol packets according to an IPv4 or IPv6 protocol.

5. The method of claim 1, wherein said step of encapsulating into network protocol packets according to a network transport protocol comprises:

encapsulating the application protocol packets into MPLS packets of fixed length according to a multiple protocol label switch MPLS protocol, wherein a MPLS virtual circuit label serves as said fifth information, and MPLS tunnel label serves to identify the connection between the network transport source address and the destination address.

6. The method of claim 1, wherein said step of encapsulating into network protocol packets according to a network transport protocol comprises:

encapsulating the application protocol packets into MPLS packets of fixed length according to a multiple protocol label switch MPLS protocol, wherein a MPLS virtual circuit label serves as said fifth information, and MPLS tunnel label serves to identify the connection between the network transport source address and the destination address;

and encapsulating the MPLS packets into network protocol packets according to an IPv4 or IPv6 protocol.

7. The method of claim 1, wherein said step of encapsulating according to a predetermined protocol comprises:

encapsulating the data segments into data packets of fixed length, wherein the data packet header comprises said fourth information; and encapsulating the data packet into RTP packets of fixed length according to real time transmission protocol RTP, as the application protocol packets, wherein the RTP packet header comprises said first information, second information and third information, and the RTP packets belonging to the same branch have the same synchronization source identifier.

8. The method of claim 1, wherein said step of encapsulating according to a predetermined protocol comprises:

encapsulating the data segments into application protocol packets of fixed length, wherein the application protocol packet header comprises said first information, second information, third information and fourth information.

9. The method of claim 1, wherein the length of the data segments is selected so that the transmission latency meets a specified requirement.

10. The method of claim 1, wherein the length of the data segments is dynamically changed according to an actual measurement of transmission latency so that the transmission latency meets a specified requirement.

11. The method of claim 1 or 5 or 6, wherein further comprising:
adjusting transmission path and forward policy in the packet network according to the source and destination of current transmission, to reduce the transmission latency and latency jitter.

12. The method of claim 1, wherein said packet network has a service quality control mechanism, said method further comprising:
setting service quality level of said network protocol packets as high as possible in said service quality control mechanism.

13. The method of claim 1, wherein said network protocol packets are transmitted in preference to other packets.

14. A method of receiving one or more branches of wireless signals between a channel processing unit and a remote radio frequency unit in a centralized base station, or between base stations through a packet network, each of said branches of wireless signals being a signal flow having a wireless frame period, the method comprising steps:
receiving network protocol packets of fixed length through a network;
parsing the network protocol packets according to a network transport protocol to obtain application protocol packets of fixed length, and fifth information identifying one of said one or more branches to which the packet belongs, said fifth information and network transport source address and destination address uniquely distinguishing said branches;
parsing the application protocol packets according to a predetermined protocol to obtain data segments, and first information indicating the sequence of the data segment of the packet in all the data segments obtain the branch to which the data segment belongs; second information indicating load type of the branch; third information indicating whether the data segment of the packet contains a data sample corresponding to the start of a wireless frame period; and fourth information indicating the position of the data sample in the data segment if the third information indicates that the data sample corresponding to the start of the wireless frame period is contained;
recovering the data segments belonging to the same branch as original wireless signals according to the fifth information, wherein the data segments are ordered according to the first information to form a digital signal data stream, reproducing the digital signal data stream into a wireless signal flow according to the second information indicating the load type, wherein if the third information indicates that a data segment includes a data sample corresponding to the start of a wireless frame period, the wireless frame timing corresponding to the data sample is recovered according to the position indicated by the fourth information when reproducing the wireless signal flow.

15. The method of claim 14, wherein each said branch comprises a wireless signal data stream belonging to the same function node, the same cell, the same carrier frequency, the same wireless interface standard and system.

16. The method of claim 15, wherein at least one branch comprises wireless signals of a plurality of parallel channels, and sample data of the at least one branch is simultaneous sample data of wireless signals of the plurality of parallel channels, said step of recovering wireless signals comprises simultaneously reproducing the wireless signals of the plurality of parallel channels according to the same wireless frame timing.

17. The method of claim 14, wherein said step of parsing the network protocol packets according to a network transport protocol comprises:
parsing the network protocol packets into user datagram protocol UDP packets of fixed length according to a IPv4 or IPv6 protocol; and
parsing the UDP packets into application protocol packets of fixed length according to the UDP protocol, and obtaining a source port number and a destination port number forming the fifth information.

18. The method of claim 14, wherein said step of parsing the network protocol packets according to a network transport protocol comprises:
processing a MPLS tunnel label and a MPLS virtual circuit label according to a multiple protocol label switch MPLS protocol; and
parsing the MPLS packets into application protocol packets according to the MPLS protocol, and obtaining a MPLS virtual circuit label as said fifth information.

19. The method of claim 14, wherein said step of parsing the network protocol packets according to a network transport protocol comprises:
parsing the network protocol packets into MPLS packets according to an IPv4 or IPv6 protocol;
processing a MPLS tunnel label and a MPLS virtual circuit label according to a multiple protocol label switch MPLS protocol; and
parsing the MPLS packets into application protocol packets according to the MPLS protocol, and obtaining a MPLS virtual circuit label as said fifth information.

20. The method of claim 14, wherein said step of parsing according to a predetermined protocol comprises:
parsing RTP packets of fixed length, as the application protocol packets, into data packets of fixed length according to a real time transmission protocol RTP, and obtaining said first information, second information and third information; and
parsing the data packets of fixed length into data segments, and obtaining said fourth information.

21. The method of claim 14, wherein said step of parsing according to a predetermined protocol comprises:
parsing the application protocol packets of fixed length into data segments, and obtaining said first information, second information, third information and fourth information.

22. The method of claim 14, wherein when the receiving party is a remote radio frequency unit, said method further comprising:
obtaining a reference clock from a global common clock.

23. The method of claim 22, wherein said global common clock source is GPS.

24. The method of claim 14, wherein when the receiving party is a remote radio frequency unit, said method further comprising:
recovering the clock by using an adaptive clock recovery technique according to said digital signal data stream.

25. The method of claim 24, wherein said adaptive clock recovery technique is PLL.

26. The method of claim 14, wherein said wireless frame timing recovering step further comprises:
if the third information indicates that a data segment includes a data sample corresponding to the start of a wireless frame period, the sample length of the data segment is subtracted by the position value indicated by the fourth information and is multiplied by the downlink sampling interval, obtaining the packing latency of the data segment; and
performing correction on the packing latency when recovering the wireless frame timing corresponding to the data sample at time of reproducing the wireless signal flow.

27. The method of claim 26, wherein said recovering wireless frame timing further comprises performing smoothing processing by using periodicity of the wireless frame timing.

28. A method of measuring round trip transmission latency of a wireless signal branch between a channel processing unit and a remote radio frequency unit in a centralized base station, said transmission being based on the predetermined transmitting method and receiving method, said measuring method comprising:
obtaining a sample data stream of wireless signal of each branch in said wireless signals;
dividing said sample data stream into consecutive data segments of fixed length;
encapsulating said data segments into application protocol packets according to a predetermined protocol, each application protocol packet further including first information indicating the sequence of the data segment of the packet in all the data segments of the branch to which the data segment belongs; second information indicating payload type of the branch; third information indicating whether the data segment of the packet contains a data sample corresponding to the start of a wireless frame period; and fourth information indicating the position of the data sample in the data segment if the third information indicates that the data sample corresponding to the start of the wireless frame period is contained; and
encapsulating the generated application protocol packets into network protocol packets according to a network transport protocol and transmitting them to a specified target, wherein the network protocol packet further includes fifth information identifying one of said one or more branches to which the packet belongs, said fifth information and network transport source address and destination address uniquely distinguishing said branches,
said receiving method comprising:
receiving network protocol packets of fixed length through a network;
parsing the network protocol packets according to a network transport protocol to obtain application protocol packets of fixed length, and fifth information identifying one of said one or more branches to which the packet belongs, said fifth information and network transport source address and destination address uniquely distinguishing said branches;
parsing the application protocol packets according to a predetermined protocol to obtain data segments, and first information indicating the sequence of the data segment of the packet in all the data segments obtain the branch to which the data segment belongs; second information indicating load type of the branch; third information indicating whether the data segment of the packet contains a data sample corresponding to the start of a wireless frame period; and fourth information indicating the position of the data sample in the data segment if the third information indicates that the data sample corresponding to the start of the wireless frame period is contained;
recovering the data segments belonging to the same branch as original wireless signals according to the fifth information, wherein the data segments are ordered according to the first information to form a digital signal data stream, reproducing the digital signal data stream into a wireless signal flow according to the second information indicating the load type, wherein if the third information indicates that a data segment includes a data sample corresponding to the start of a wireless frame period, the wireless frame timing corresponding to the data sample is recovered according to the position indicated by the fourth information when reproducing the wireless signal flow,
said measuring method comprising:
transmitting a first network protocol packet by the channel processing unit to the remote radio frequency unit, wherein the data segment therein includes a data sample corresponding to the start of a wireless frame period on the channel processing unit;
receiving a second network protocol packet transmitted from the remote radio frequency unit on the channel processing unit, wherein the data segment therein includes a data sample corresponding to the start of a wireless frame period on the remote radio frequency unit, and the wireless frame period corresponds to the wireless frame period on said channel processing unit;
calculating a time difference from the start of the above transmitting step to the end of the above receiving step;
respectively calculating packing latencies of said first and second network protocol packets, the latency being equal to the sample length of the data segment in the network protocol packet subtracted by the position value indicated by the fourth information and multiplied by the corresponding sampling interval; and
subtracting said two packing latencies from said time difference to obtain the round trip transmission latency.

29. The method of claim 28, wherein said round trip transmission latency comprises a downlink transmission latency from the channel processing unit to the remote radio frequency unit, the downlink transmission latency being equal to said round trip transmission latency multiplied by a predetermined proportion factor.

30. The method of claim 29, wherein said predetermined proportion factor is 0.5.

31. A method in a centralized base station of adjusting the wireless frame timing of a remote radio frequency unit through the wireless signal branch transmission between a channel processing unit and the remote radio frequency unit, said transmission being based on the predetermined transmitting method and receiving method, said adjusting method comprising:
obtaining a sample data stream of wireless signal of each branch in said wireless signals;
dividing said sample data stream into consecutive data segments of fixed length;
encapsulating said data segments into application protocol packets according to a predetermined protocol, each application protocol packet further including first information indicating the sequence of the data segment of the packet in all the data segments of the branch to which the data segment belongs; second information indicating payload type of the branch; third information indicating whether the data segment of the packet contains a data sample corresponding to the start of a wireless frame period; and fourth information indicating the position of the data sample in the data segment if the third information indicates that the data sample corresponding to the start of the wireless frame period is contained; and encapsulating the generated application protocol packets into network protocol packets according to a network transport protocol and transmitting them to a specified target, wherein the network protocol packet further includes fifth information identifying one of said one or more branches to which the packet belongs, said fifth information and network transport source address and destination address uniquely distinguishing said branches, said receiving method comprising:

receiving network protocol packets of fixed length through a network;

parsing the network protocol packets according to a network transport protocol to obtain application protocol packets of fixed length, and fifth information identifying one of said one or more branches to which the packet belongs, said fifth information and network transport source address and destination address uniquely distinguishing said branches;

parsing the application protocol packets according to a predetermined protocol to obtain data segments, and first information indicating the sequence of the data segment of the packet in all the data segments obtain the branch to which the data segment belongs; second information indicating load type of the branch; third information indicating whether the data segment of the packet contains a data sample corresponding to the start of a wireless frame period; and fourth information indicating the position of the data sample in the data segment if the third information indicates that the data sample corresponding to the start of the wireless frame period is contained;

recovering the data segments belonging to the same branch as original wireless signals according to the fifth information, wherein the data segments are ordered according to the first information to form a digital signal data stream, reproducing the digital signal data stream into a wireless signal flow according to the second information indicating the load type, wherein if the third information indicates that a data segment includes a data sample corresponding to the start of a wireless frame period, the wireless frame timing corresponding to the data sample is recovered according to the position indicated by the fourth information when reproducing the wireless signal flow, said adjusting method comprising:

transmitting a first network protocol packet by the channel processing unit to the remote radio frequency unit, wherein the data segment therein includes a data sample corresponding to the start of a wireless frame period on the channel processing unit;

receiving a second network protocol packet transmitted from the remote radio frequency unit on the channel processing unit, wherein the data segment therein includes a data sample corresponding to the start of a wireless frame period on the remote radio frequency unit, and the wireless frame period corresponds to the wireless frame period on said channel processing unit;

calculating a time difference from the start of the above transmitting step to the end of the above receiving step;

respectively calculating packing latencies of said first and second network protocol packets, the latency being equal to the sample length of the data segment in the network protocol packet subtracted by the position value indicated by the fourth information and multiplied by the corresponding sampling interval;

subtracting said two packing latencies from said time difference to obtain the round trip transmission latency;

multiplying said round trip transmission latency by a predetermined proportion factor to obtain a downlink transmission latency; and advancing the transmitting time of the branch relative to the wireless frame timing by a time amount equal to said downlink transmission latency.

32. The method of claim 31, wherein said predetermined proportion factor is 0.5.

33. The method of claim 31, wherein said recovering step in said receiving method further comprises:

if the third information indicates that a data segment includes a data sample corresponding to the start of a wireless frame period, the sample length of the data segment is subtracted by the position value indicated by the fourth information and is multiplied by the downlink sampling interval, obtaining the packing latency of the data segment; and performing correction on the packing latency when recovering the wireless frame timing corresponding to the data sample at time of reproducing the wireless signal flow.

34. The method of claim 33, wherein said recovering wireless frame timing further comprises performing smoothing processing by using periodicity of the wireless frame timing.

* * * * *